US012630370B2

(12) United States Patent
Fye et al.

(10) Patent No.: US 12,630,370 B2
(45) Date of Patent: May 19, 2026

(54) ACTUATOR FOR ADJUSTABLE CONVEYOR GUIDERAIL

(71) Applicant: SPAN TECH LLC, Glasgow, KY (US)

(72) Inventors: Stephen C. Fye, Glasgow, KY (US); Aaron Cotton, Glasgow, KY (US); James L. Layne, Bowling Green, KY (US)

(73) Assignee: SPAN TECH LLC, Glasgow, KY (US)

( * ) Notice: Subject to any disclaimer, the term of this patent is extended or adjusted under 35 U.S.C. 154(b) by 77 days.

(21) Appl. No.: 18/710,919

(22) PCT Filed: Nov. 16, 2022

(86) PCT No.: PCT/US2022/050054
§ 371 (c)(1),
(2) Date: May 24, 2024

(87) PCT Pub. No.: WO2023/091453
PCT Pub. Date: May 25, 2023

(65) Prior Publication Data

US 2025/0033891 A1 Jan. 30, 2025

Related U.S. Application Data

(60) Provisional application No. 63/279,914, filed on Nov. 16, 2021.

(51) Int. Cl.
*B65G 21/20* (2006.01)

(52) U.S. Cl.
CPC ................................ *B65G 21/2072* (2013.01)

(58) Field of Classification Search
CPC .................................................. B65G 21/2072
USPC ................................ 198/836.1, 836.3–836.4
See application file for complete search history.

(56) References Cited

U.S. PATENT DOCUMENTS 6,378,695 B1 * 4/2002 Rinne ................ B65G 21/2072 198/836.3
9,828,186 B2 * 11/2017 Weickert ............ B65G 21/2072
11,639,271 B2 * 5/2023 Layne .................... B65G 21/22 198/836.1

(Continued)

FOREIGN PATENT DOCUMENTS

| | | | |
|---|---|---|---|
| CN | 211733699 | U | 10/2020 |
| EP | 2473428 | B1 | 12/2013 |
| KR | 20200053961 | A | 5/2020 |

*Primary Examiner* — Mark A Deuble
(74) *Attorney, Agent, or Firm* — Dickinson Wright PLLC; Andrew D. Dorisio; Nicholas P. Coleman

(57) ABSTRACT

A system includes a conveyor and a cable adapted to travel along an endless path to extend or retract a first adjustable guiderail for guiding one or more articles when being conveyed along the conveyor. A cable actuator adapted to move the cable along an endless path. The cable actuator may include a capstan adapted to receive at least a portion of the cable and rotate to cause the cable to move along the endless path, a tensioner adapted to tension the cable, or both the capstan and the tensioner. First and second adjustable guiderails may also be provided, along with a controller for controlling associated cable actuators. The controller may include a plurality of preset conditions, each corresponding to a width of an article to be conveyed or to a width of the conveying path between the first adjustable guiderail and the second adjustable guiderail.

22 Claims, 35 Drawing Sheets

(56) References Cited

U.S. PATENT DOCUMENTS

| | | | | |
|---|---|---|---|---|
| 11,840,403 | B2 * | 12/2023 | Layne | B65G 21/22 |
| 11,912,507 | B2 * | 2/2024 | Layne | B65G 21/10 |
| 2009/0062046 | A1 * | 3/2009 | Lindemann | F16H 7/1263<br>474/101 |
| 2010/0258664 | A1 * | 10/2010 | Twork | B65H 57/04<br>242/155 R |
| 2011/0079493 | A1 | 4/2011 | Bell | |
| 2013/0015315 | A1 | 1/2013 | Hoffend, III | |
| 2020/0079593 | A1 * | 3/2020 | Layne | B65G 47/28 |
| 2021/0047128 | A1 | 2/2021 | Layne | |

* cited by examiner

ACTUATOR FOR ADJUSTABLE CONVEYOR GUIDERAIL

This application claims the benefit of U.S. Provisional Patent Application Ser. No. 63/279,914, filed Nov. 16, 2021, the disclosure of which is incorporated herein by reference.

TECHNICAL FIELD

This disclosure relates to the article conveying arts and, in particular, to an actuator for an adjustable conveyor guiderail.

BACKGROUND

Conveyors typically have rails positioned along each side of the conveyor chain or belt to guide an article along a conveying path. Articles travel between the rails, which are positioned to ensure that the articles remain on the conveying path. When a larger or smaller article is conveyed, or the width of the conveying path otherwise needs to be adjusted to accommodate an increased or reduced article flow, one or both of the guiderails must be adjusted to fit the situation.

Conventional guiderail adjustment systems use laterally extending guide rods, which support a bracket attached to the guiderail. When the guiderails need to be adjusted, the rods can be moved along the brackets, which is typically manually done. These guide rods also protrude outwardly away from the conveyor and into the surrounding area, thus increasing the overall width and footprint of the conveyor. The guiderails including rigid rods also create an unappealing look, since the extended portions of the rods project from the conveyor sides.

Accordingly, a need is identified for an actuator for an adjustable guiderail that overcomes the foregoing limitations and possibly others that have yet to be realized.

SUMMARY

According to a first aspect of the disclosure, a system includes a conveyor and a cable adapted to travel along an endless path to extend or retract a first adjustable guiderail for guiding one or more articles when being conveyed along the conveyor. The system includes a cable actuator adapted to move the cable along an endless path. The cable actuator comprises a capstan adapted to receive at least a portion of the cable and rotate to cause the cable to move along the endless path. A tensioner adapted to tension the cable is also provided.

The cable actuator further comprises a driver for driving the capstan. In one embodiment, the driver comprises a worm gear. The worm gear may be driven by a hand wheel or a motor.

A limit switch may be provided to stop the capstan upon rotation of the rotatable driver by a first predetermined amount in a first direction corresponding to extension of the first adjustable guiderail. The limit switch may be adapted to stop the capstan upon rotation of the rotatable driver a second predetermined amount in a second direction opposite the first direction corresponding to retraction of the first adjustable guiderail.

In one embodiment, the tensioner comprises a first pulley and a second pulley, the cable is adapted to extend around the first pulley and the second pulley, and the cable actuator is adapted to change a distance between the first and second pulleys. A tensioning sled may be provided to which the second pulley is attached. The tensioning sled is adapted to travel along one or more rods. The first pulley may be located closer to one end of the conveyor and the second pulley is located closer to an opposite end of the conveyor.

An indicator adapted to indicate a change in cable tension. The indicator comprises an indicator plate connected to the tensioning sled. Alignment of the indicator plate with a predetermined location on the cable actuator corresponds to a predetermined tension in the cable.

The system may also include a rotational stop adapted to limit a rotational distance traveled by the capstan. In one embodiment, the rotational stop comprises at least one extension adapted to engage a stationary stop to limit rotation of the capstan. The stationary stop may comprise a limit switch for halting movement of the capstan. The rotational stop may comprise a plurality of stop plates, each of the stop plates including at least one extension, wherein the plurality of stop plates are adapted to be adjustable in a plurality of relative angular positions in order to offset a respective first extension on a first of the plurality of stop plates from a respective second extension on a second of the plurality of stop plates. At least one of the plurality of stop plates includes at least one adjustment aperture, and further including a connector adapted to pass through the at least one adjustment aperture for fixing relative angular positions of the plurality of stop plates. The rotational stop and the capstan may be commonly mounted on a central shaft.

The system may further include a second cable adapted to travel along a second continuous path for extending and retracting a second adjustable guiderail. A second cable actuator is adapted to move the second cable along the second continuous path. The first adjustable guiderail and the second adjustable guiderail are in opposition along the conveyor, and extension and retraction of the first adjustable guiderail and the second adjustable guiderail changing a width of a conveying path therebetween.

A controller may be adapted to coordinate control of the first cable actuator and the second cable actuator. The controller comprises a plurality of preset conditions for the first and second adjustable guiderails, each of the preset conditions corresponding to a width of a different article to be conveyed.

According to a further aspect of the disclosure, a system for a conveyor for conveying one or more articles is provided. The system includes a first adjustable guiderail for guiding the one or more articles on the conveyor. A cable is adapted to move for extending or retracting the first adjustable guiderail. A cable actuator including a capstan is adapted to receive at least a portion of the cable and rotate to cause the cable to move along the endless path.

In one embodiment, the cable actuator further comprises a driver for driving the capstan. The driver may comprise a worm gear, which may be driven by a hand wheel or a motor.

A limit switch may be provided to stop the capstan upon rotation of the rotatable driver by a first predetermined amount in a first direction corresponding to extension of the first adjustable guiderail. The limit switch may be adapted to stop the capstan upon rotation of the rotatable driver a second predetermined amount in a second direction opposite the first direction corresponding to retraction of the first adjustable guiderail.

A tensioner adapted to tension the cable may also be provided. In one example, the tensioner comprises a first pulley and a second pulley, the cable is adapted to extend around the first pulley and the second pulley, and the cable actuator is adapted to change a distance between the first and second pulleys. A tensioning sled may be attached to the second pulley. The tensioning sled may be adapted to travel along one or more rods. The first pulley may be located closer to one end of the conveyor and the second pulley is located closer to an opposite end of the conveyor.

The system may further include an indicator adapted to indicate a change in cable tension. The indicator may comprise an indicator plate connected to the tensioning sled, and wherein alignment of the indicator plate with a predetermined location on the cable actuator corresponds to a predetermined tension in the cable. A rotational stop adapted to limit rotation of the capstan may also be provided, which may include at least one extension adapted to engage a stationary stop to limit rotation of the capstan. The stationary stop may comprise a limit switch for limiting rotation of the capstan based on contact with the at least one extension. The rotational stop may comprise a plurality of stop plates, each of the stop plates including at least one extension, wherein the plurality of stop plates are adapted to be adjustable with respect to each other in a plurality of angular positions to offset a respective first extension on a first of the plurality of stop plates from a respective second extension on a second of the plurality of stop plates. At least one of the plurality of stop plates includes at least one adjustment aperture, and further including a connector adapted to pass through the at least one adjustment aperture for fixing relative angular positions of the plurality of stop plates. The rotational stop and the capstan may be commonly mounted on a central shaft.

The system may further include a second cable adapted to travel along a second endless path for extending and retracting a second adjustable guiderail. A second cable actuator may be adapted to move the second cable along the second endless path. The first adjustable guiderail and the second adjustable guiderail are in opposition along the conveyor, and extension and retraction of the first adjustable guiderail and the second adjustable guiderail changing a width of a conveying path therebetween.

A controller adapted to coordinate control of the first cable actuator and the second cable actuator may also form part of the system. The controller may comprise a plurality of preset conditions for the first adjustable guiderail and the second adjustable guiderail, each of the preset conditions corresponding to a width of a different article to be conveyed.

A further aspect of the disclosure relates to a system for use with a conveyor for conveying one or more articles. The system includes a first adjustable guiderail for guiding the one or more articles on the conveyor. A cable is adapted to travel along an endless path to extend or retract the first adjustable guiderail. A cable actuator is adapted to move the cable along the endless path, the cable actuator comprising a tensioner for tensioning the cable, the tensioner comprising a first pulley for engaging the cable.

In one embodiment, the cable actuator further comprises a driver for driving a capstan for at least partially receiving a portion of the cable. The driver may comprise a worm gear, which may be driven by a hand wheel or a motor.

A limit switch may serve to stop the capstan upon rotation of the driver by a first predetermined amount in a first direction corresponding to extension of the first adjustable guiderail. The limit switch may be adapted to stop the capstan upon rotation of the driver a second predetermined amount in a second direction opposite the first direction corresponding to retraction of the first adjustable guiderail.

The tensioner may further comprise a second pulley. In such case, the cable is adapted to extend around the first pulley and the second pulley. The cable actuator is adapted to change a distance between the first and second pulleys.

A tensioning sled may be attached to the second pulley. The tensioning sled may be adapted to travel along one or more rods. The first pulley may be located closer to one end of the conveyor and the second pulley is located closer to an opposite end of the conveyor.

An indicator adapted to indicate a change in cable tension may also be provided. The indicator may comprise an indicator plate connected to the tensioning sled, and wherein alignment of the indicator plate with a predetermined location on the cable actuator corresponds to a predetermined tension in the cable.

A rotational stop may be adapted to limit rotation of the capstan. The rotational stop may comprise at least one extension adapted to engage a stationary stop to limit rotation of the capstan. The stationary stop may comprise a limit switch for limiting rotation of the capstan based on contact between the at least one extension and the limit switch. In one example, the rotational stop comprises a plurality of stop plates, each of the stop plates including at least one extension, wherein the plurality of stop plates are adapted to be adjustable in a plurality of angular positions in order to offset a respective first extension on a first of the plurality of stop plates from a respective second extension on a second of the plurality of stop plates. At least one of the plurality of stop plates includes at least one adjustment aperture, and further including a connector adapted to pass through the at least one adjustment aperture for fixing relative angular positions of the plurality of stop plates. The rotational stop and the capstan may be commonly mounted on a central shaft.

The system may further comprise a second cable adapted to travel along a second endless path for extending and retracting a second adjustable guiderail. A second cable actuator adapted to move the second cable along the second endless path. The first adjustable guiderail and the second adjustable guiderail may be arranged in opposition along the conveyor, and extension and retraction of the first adjustable guiderail and the second adjustable guiderail changing a width of a conveying path therebetween.

A controller may be adapted to coordinate control of the first cable actuator and the second cable actuator. The controller comprises a plurality of preset conditions for the first adjustable guiderail and the second adjustable guiderail, each of the preset conditions corresponding to a width of a different article to be conveyed.

Still a further aspect of the disclosure relates to a system for a conveyor for conveying one or more articles. The system comprises a first adjustable guiderail for guiding the one or more articles on the conveyor, a first cable adapted to travel along a first endless path to extend or retract the first adjustable guiderail, and a first cable actuator adapted to move the first cable along the first endless path. The system further comprises a second adjustable guiderail for guiding the one or more articles on the conveyor, a second cable adapted to travel along a second endless path to extend or retract the second adjustable guiderail, and a second cable actuator adapted to move the second cable along the second endless path. A controller is adapted to coordinate control of the first cable actuator and the second cable actuator. The controller may comprise a plurality of preset conditions, each of the preset conditions corresponding to a width of an article to be conveyed, and wherein each of the preset conditions further corresponds to a width of the conveying path between the first adjustable guiderail and the second adjustable guiderail.

BRIEF DESCRIPTION OF THE DRAWING FIGURES

The accompanying drawing figures incorporated herein and forming a part of the specification, illustrate several aspects of the disclosed inventions and, together with the textual description, serve to explain certain principles thereof. In the drawing figures.

Figure 1:
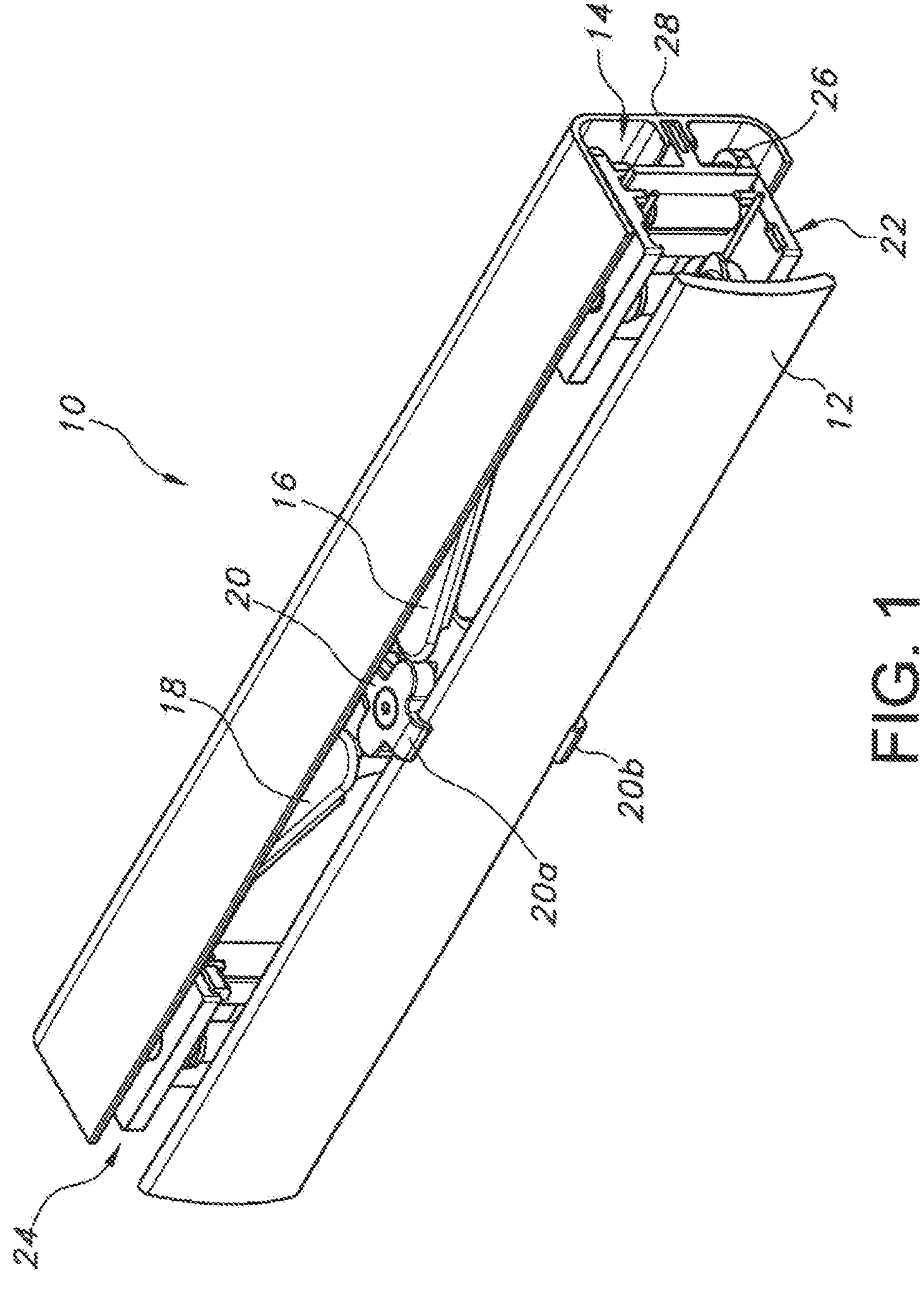
FIG. 1 is a top perspective view of one embodiment of a single conveyor guiderail adjuster according to one embodiment of the disclosure.
Figure 2:
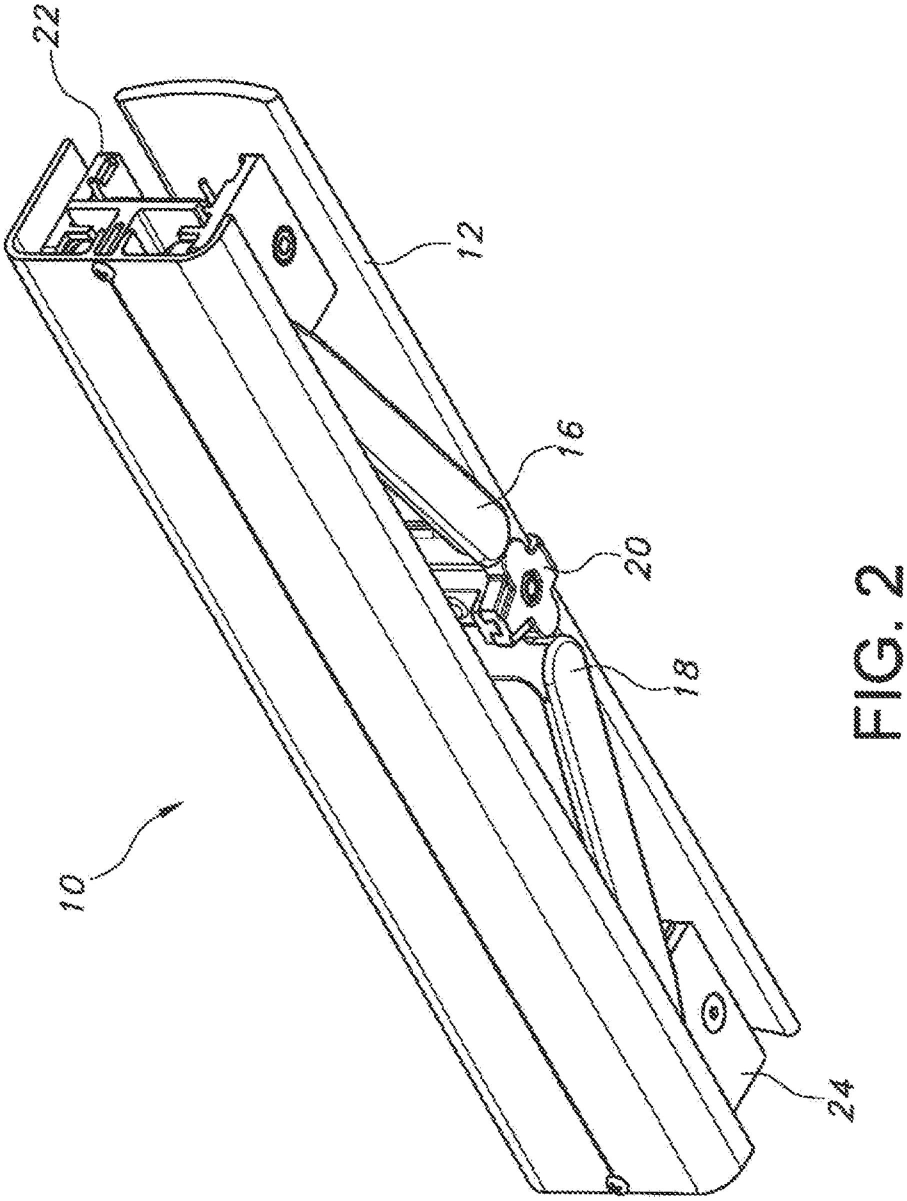
FIG. 2 is a bottom perspective view of the adjuster of FIG. 1.
Figure 3:
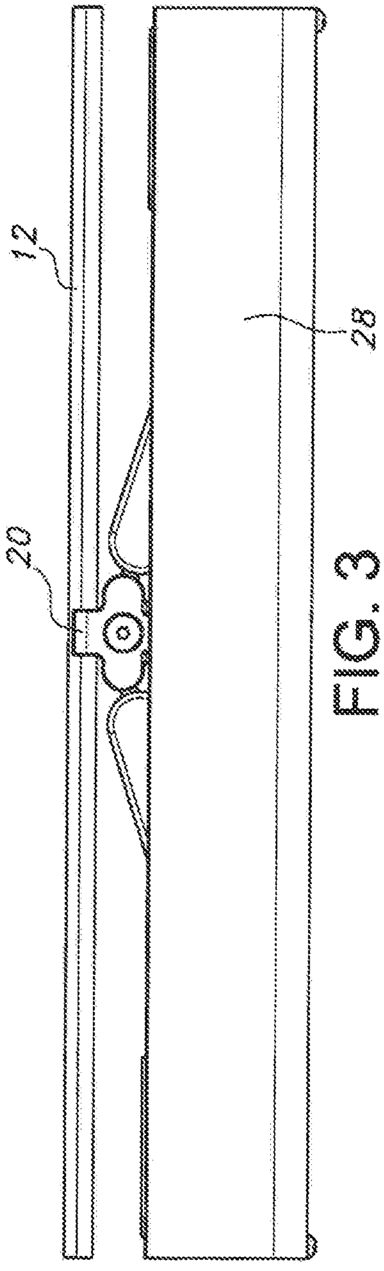
Figure 4:
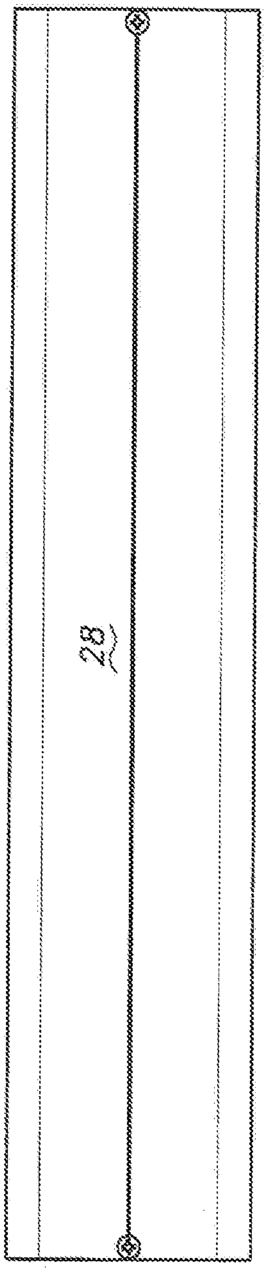
Figure 5:
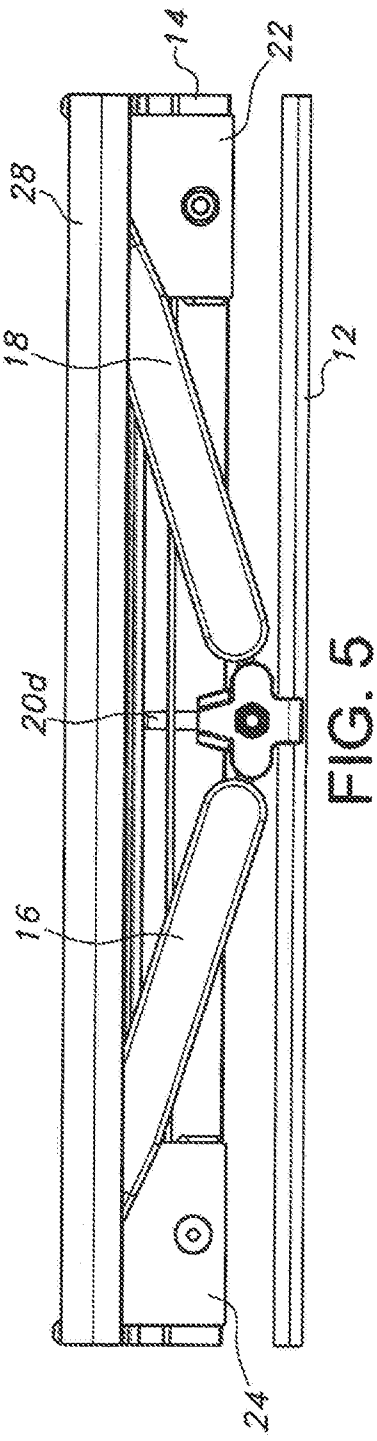
Figure 6:
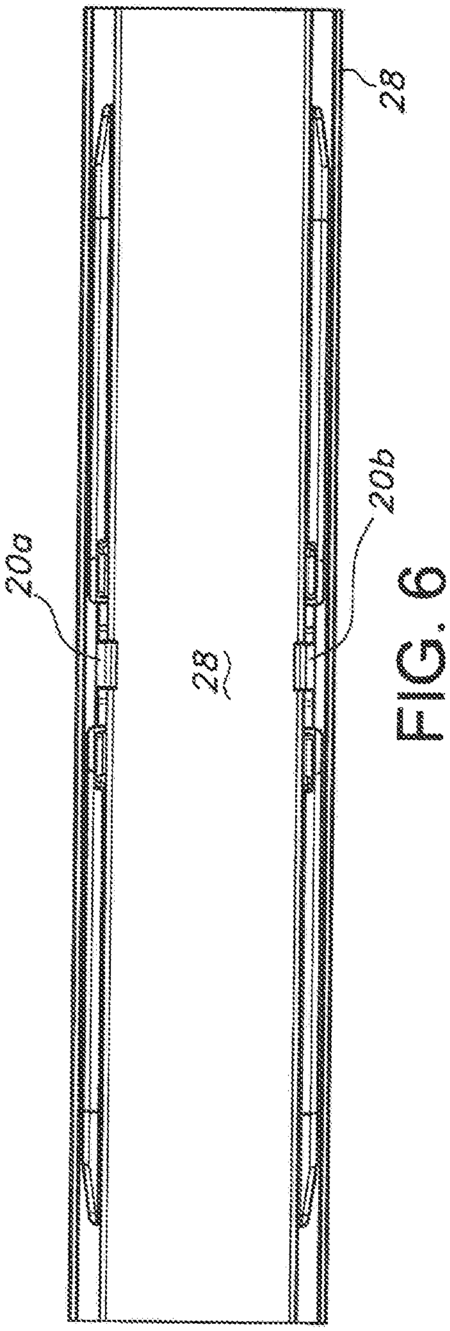
Figure 8:
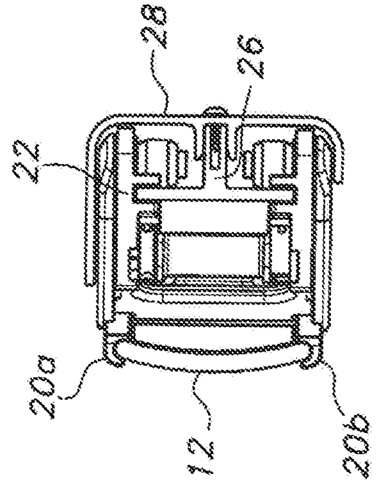
Figure 7:
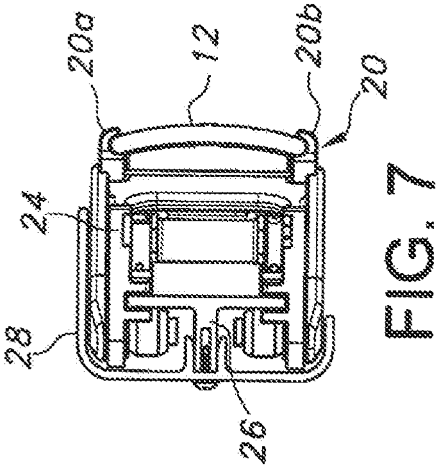
Figure 9:
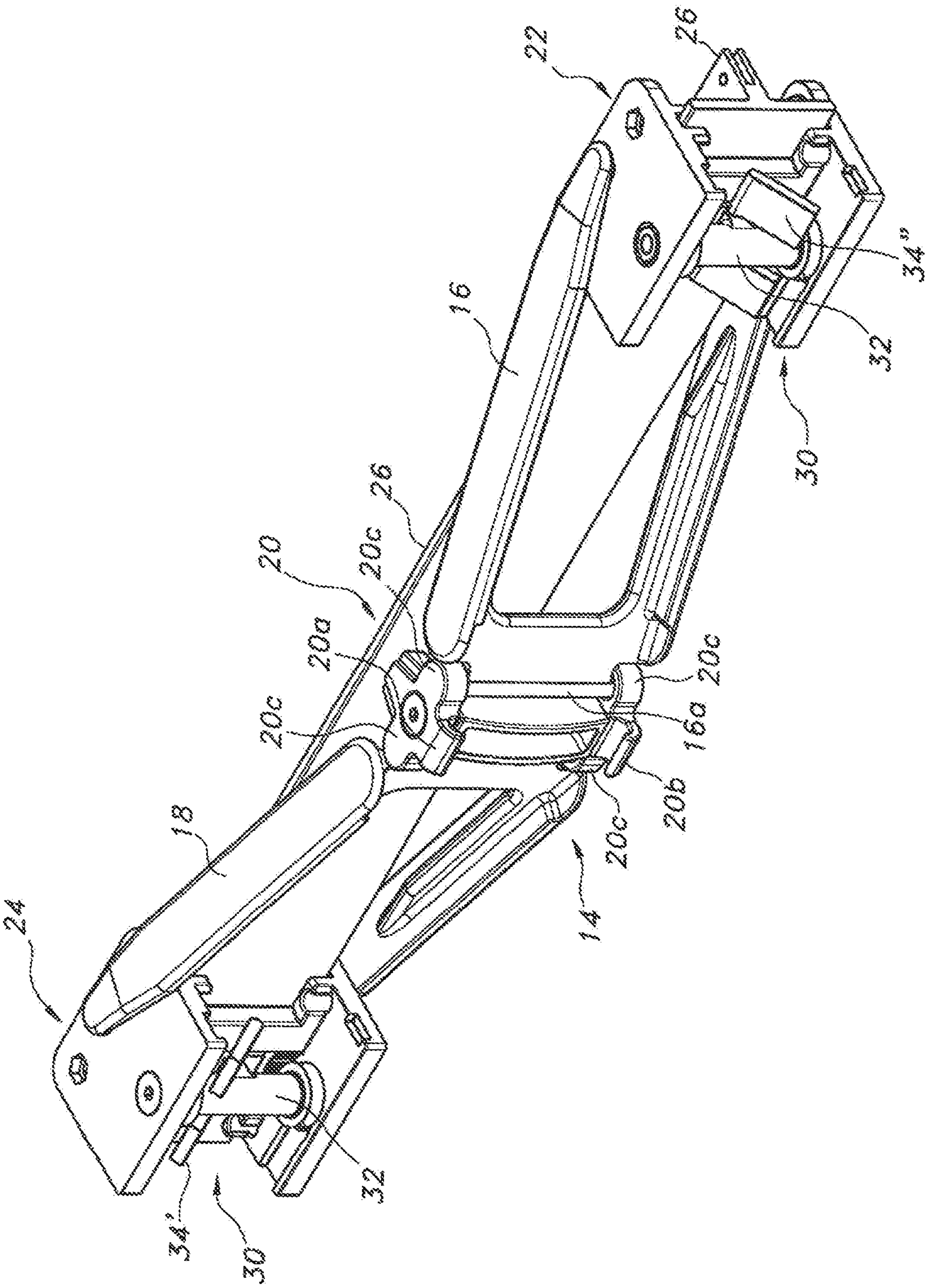
Figure 9A:
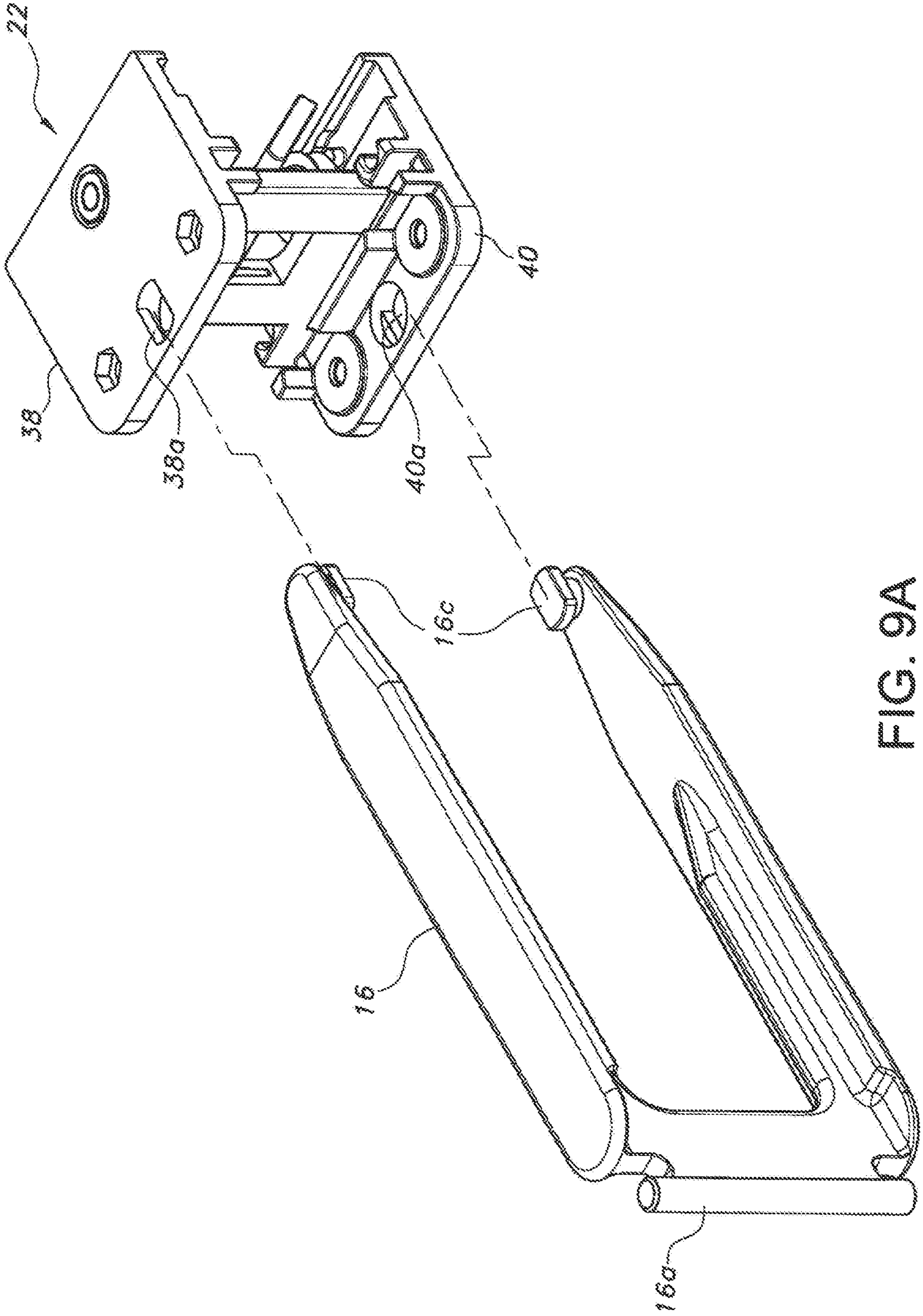
Figure 9C:
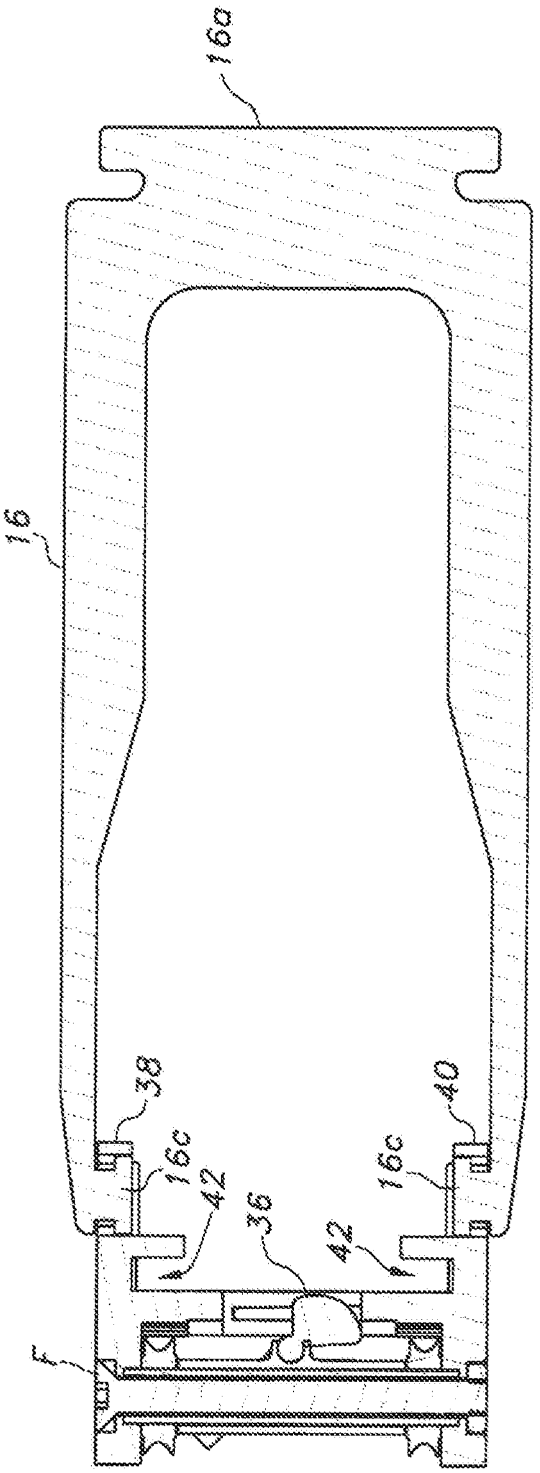
Figure 9B:
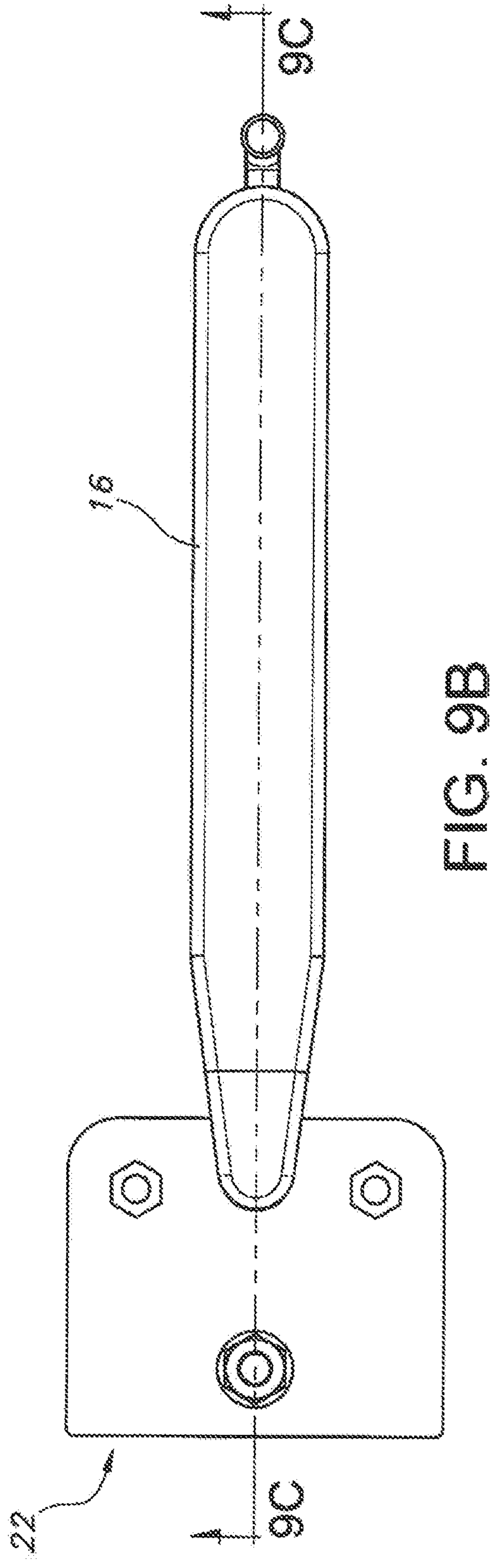
Figure 10:
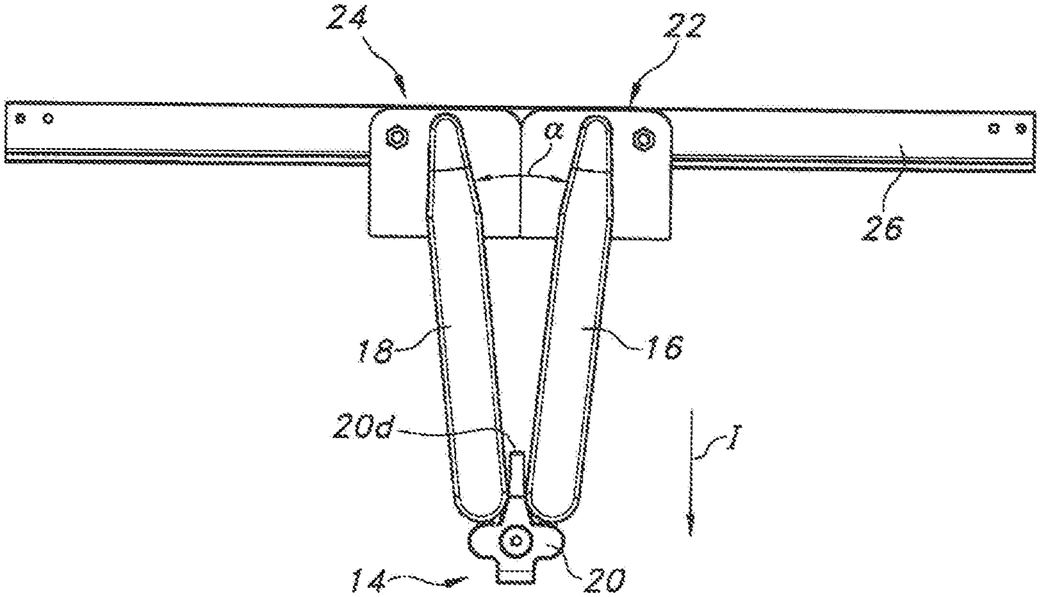
Figure 11:
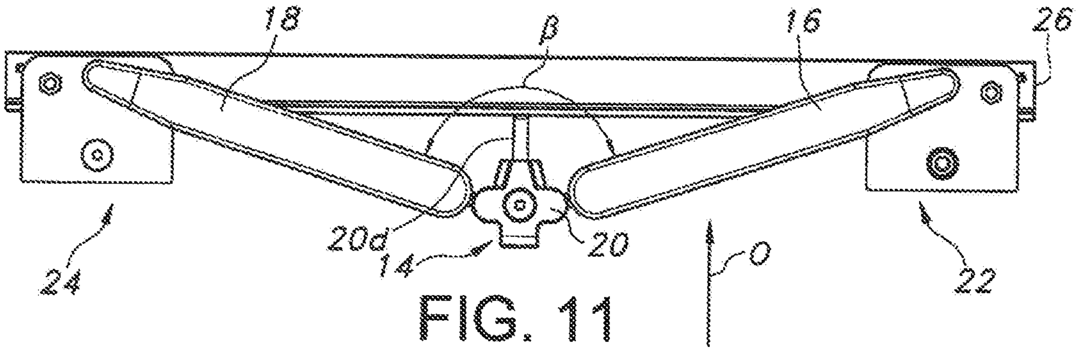
Figure 12:
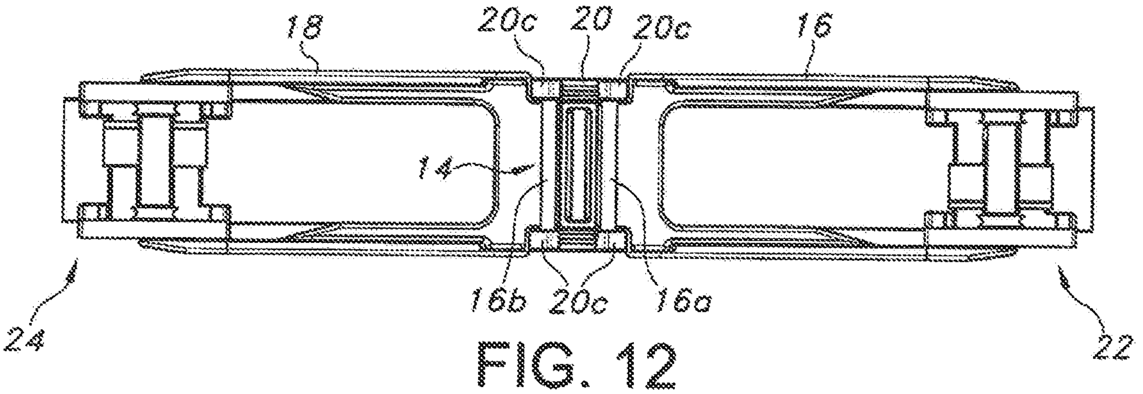
Figure 14:
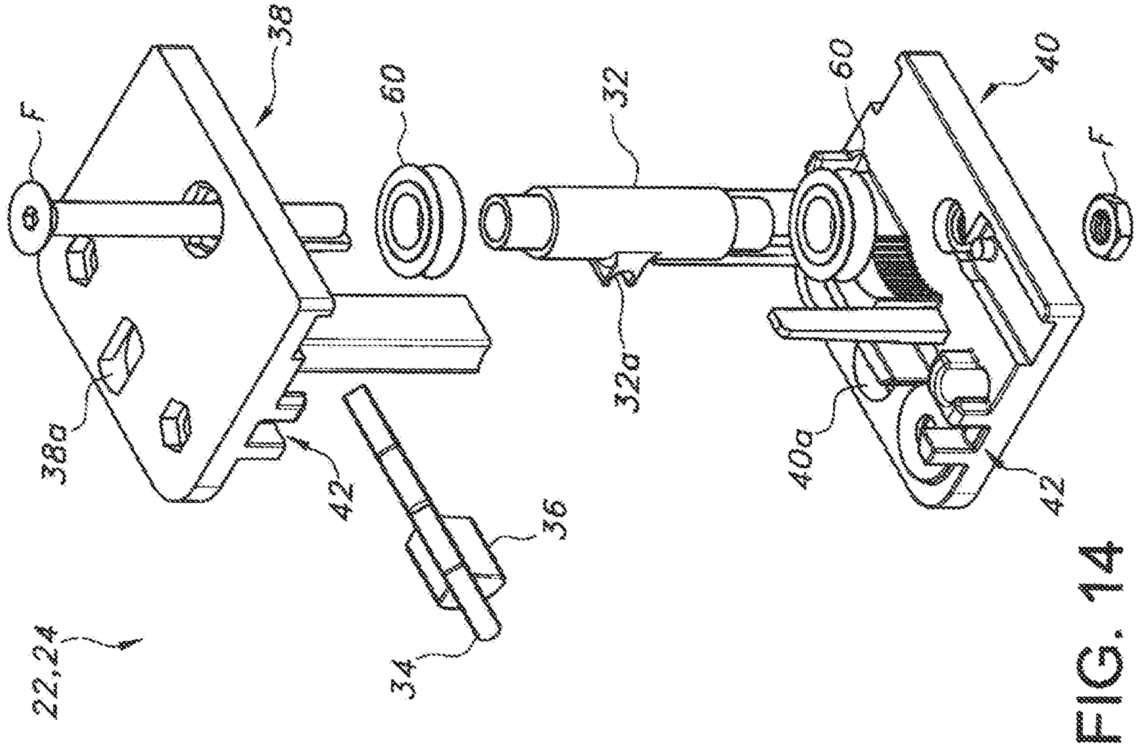
Figure 13:
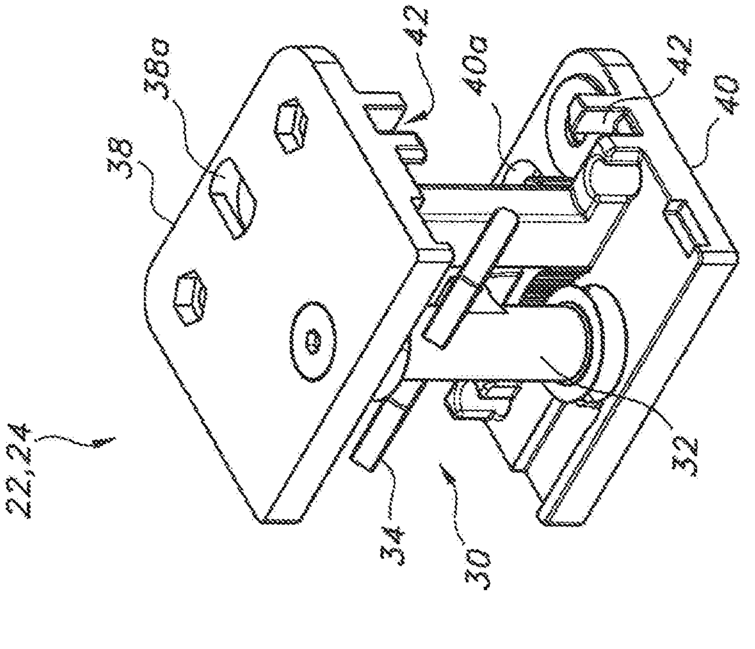
Figure 16:
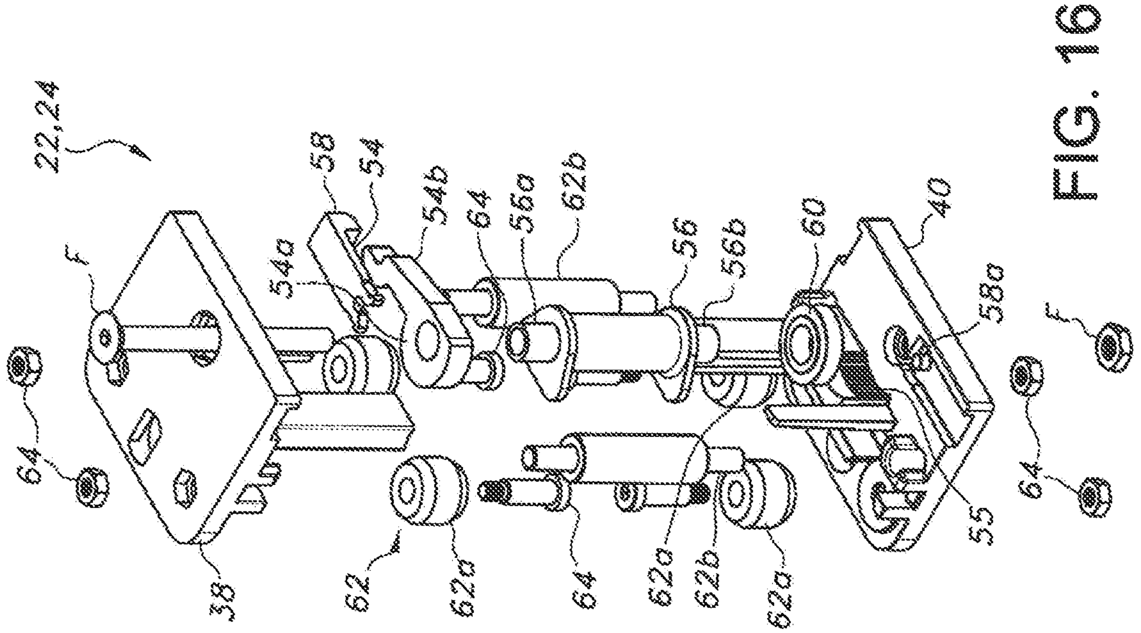
Figure 15:
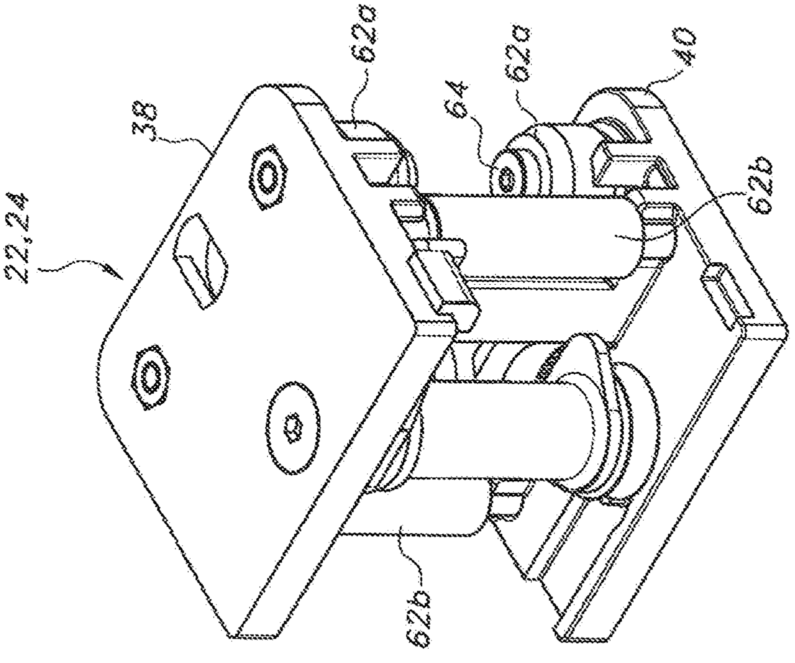
Figure 16A:
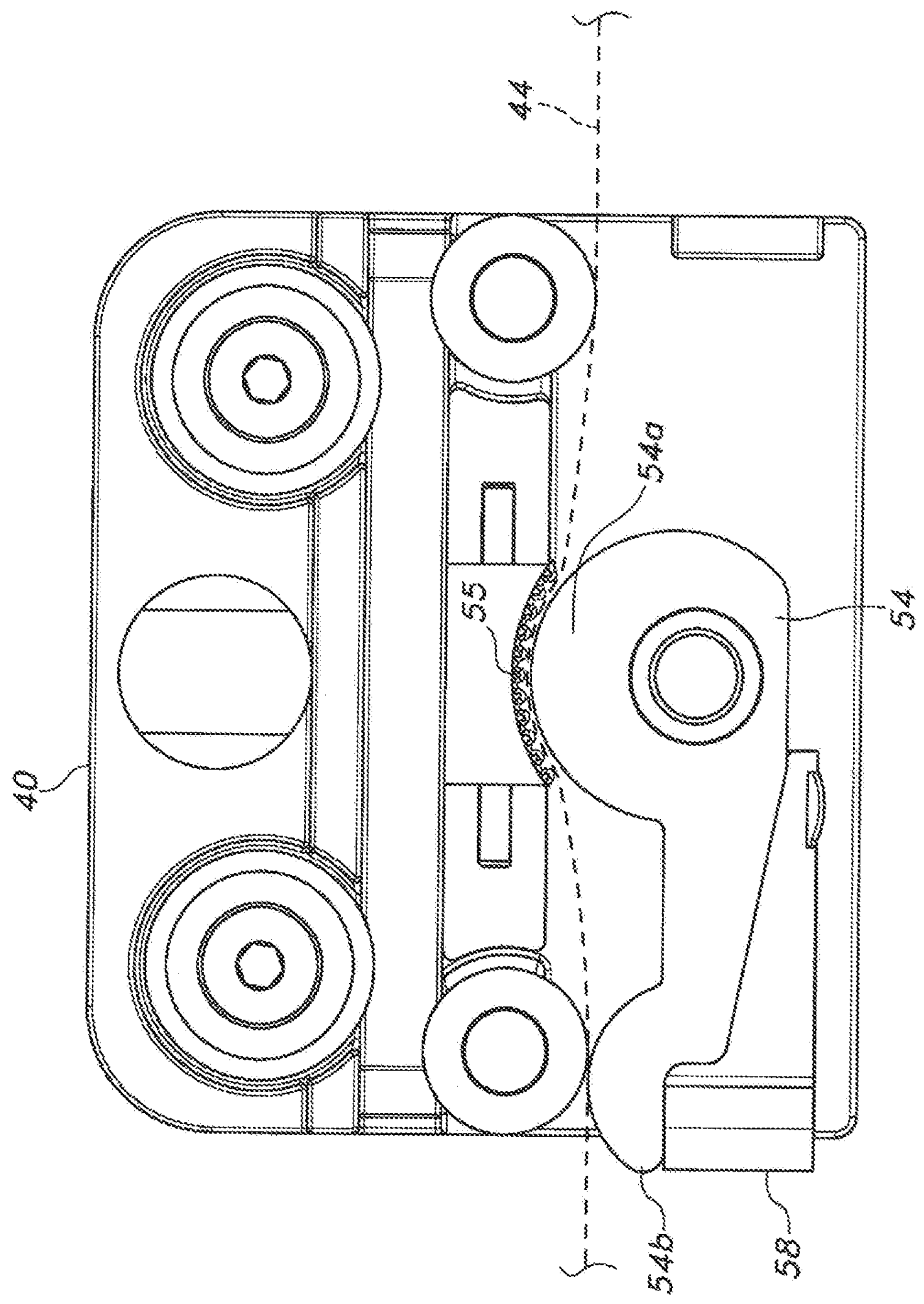
Figure 17:
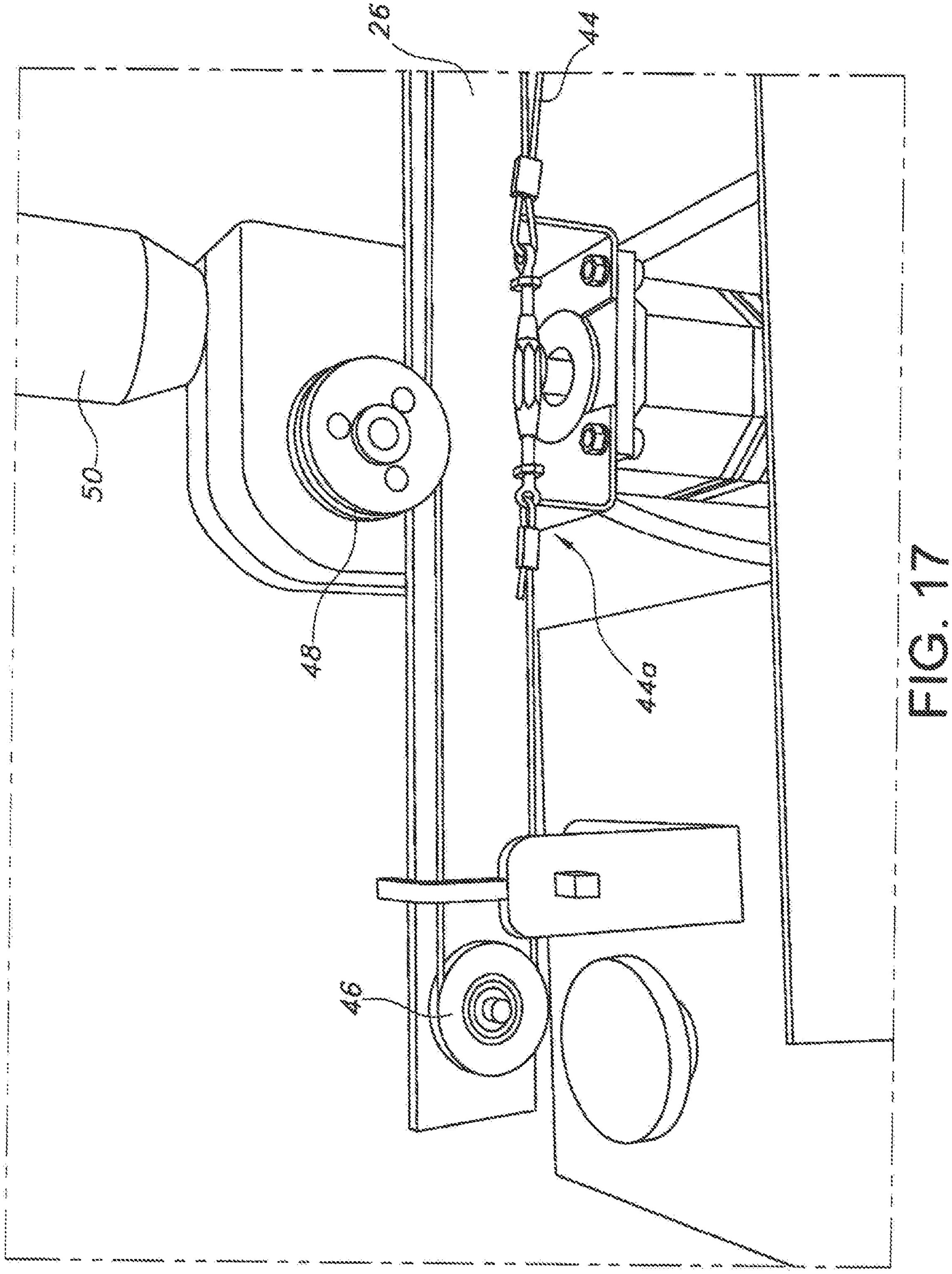
Figure 18:
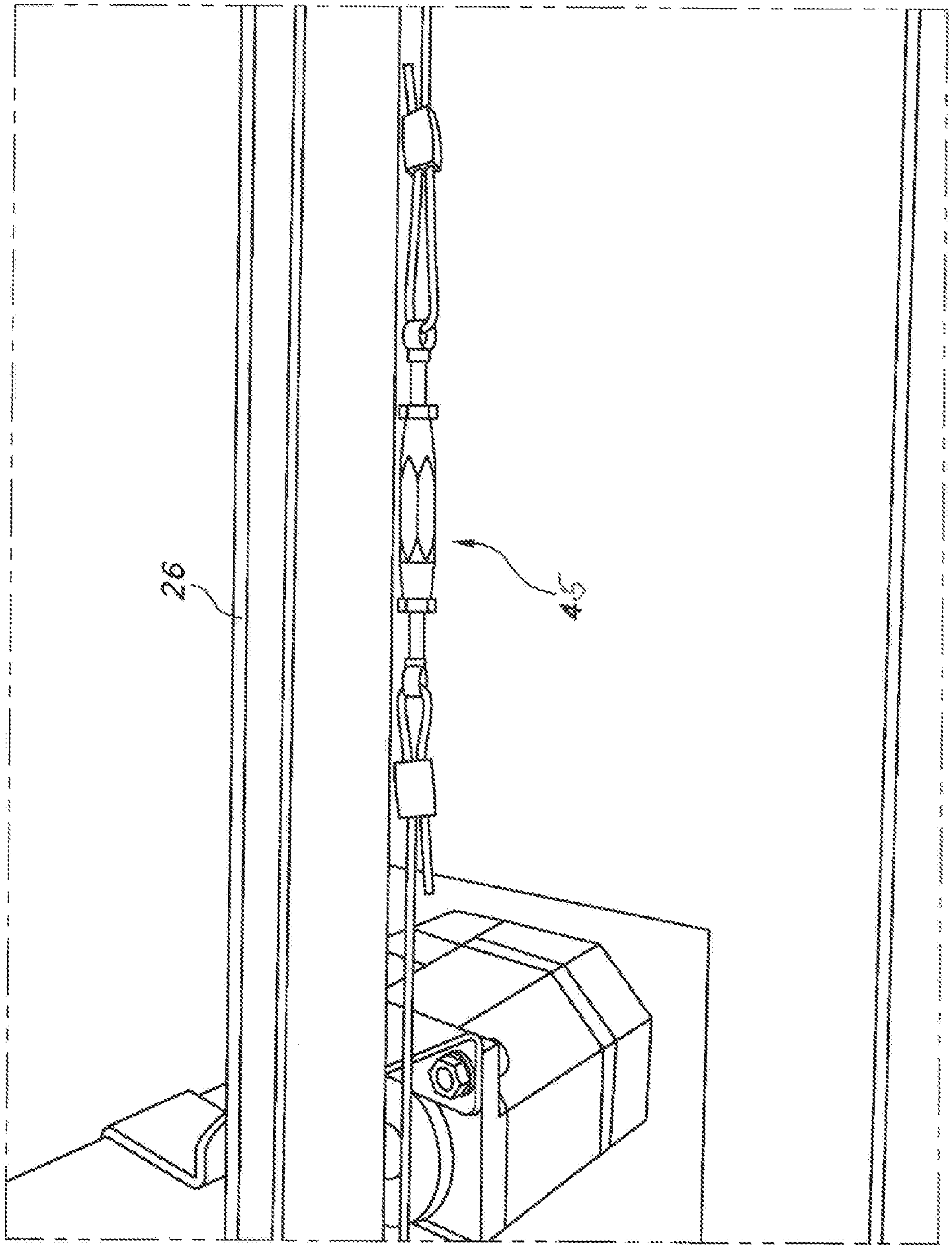
Figure 24:
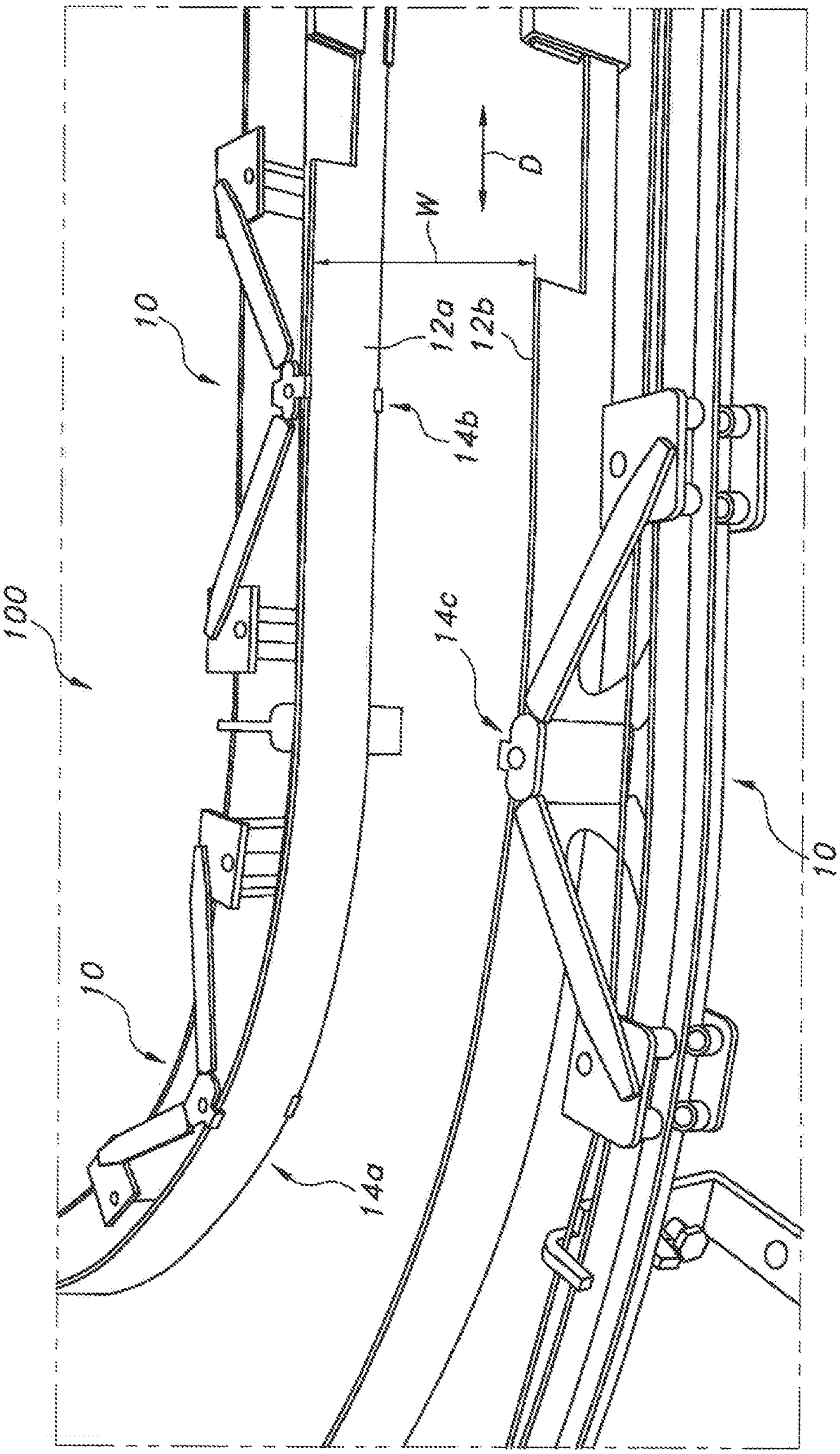
Figure 25:
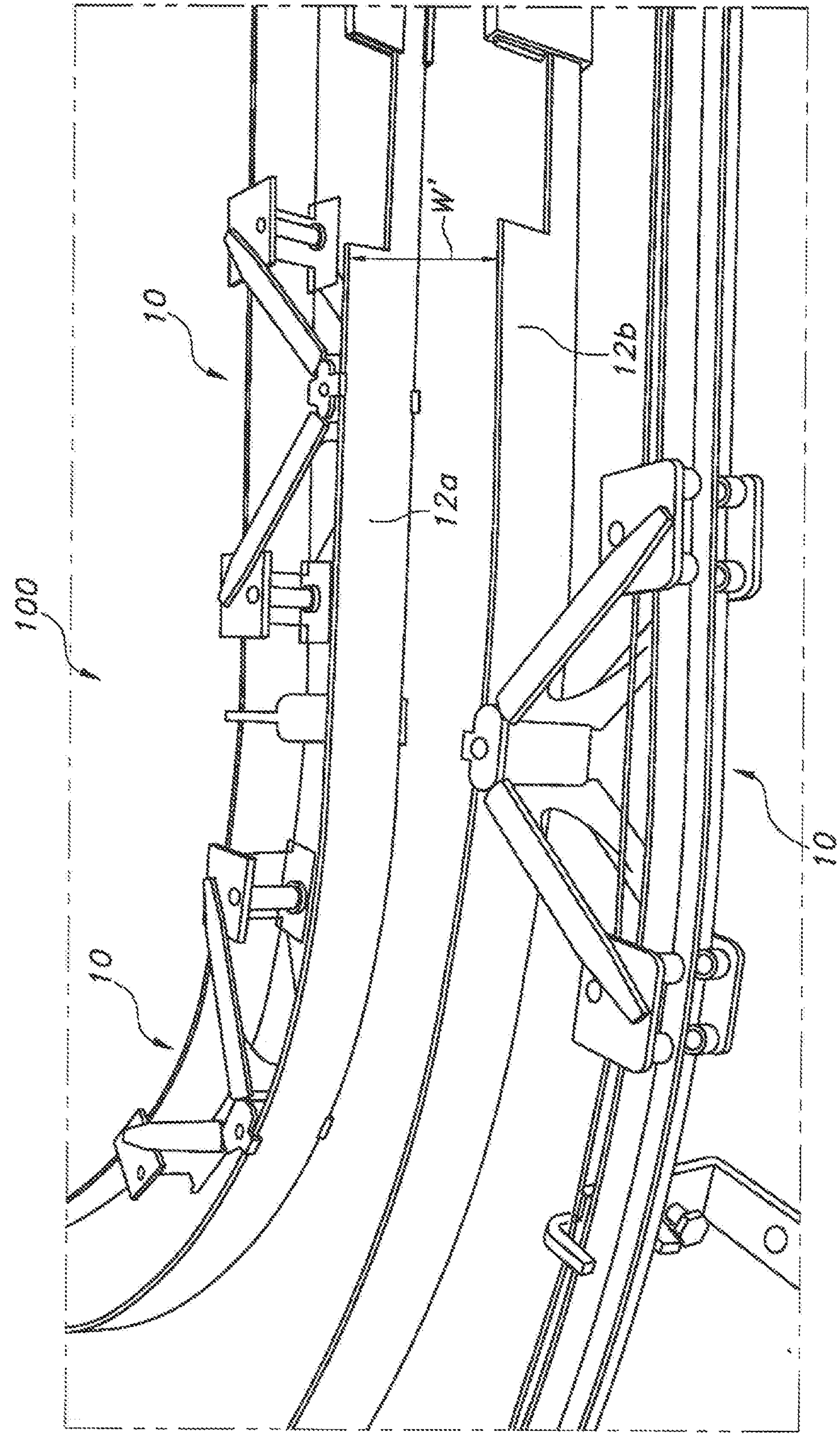
Figure 26:
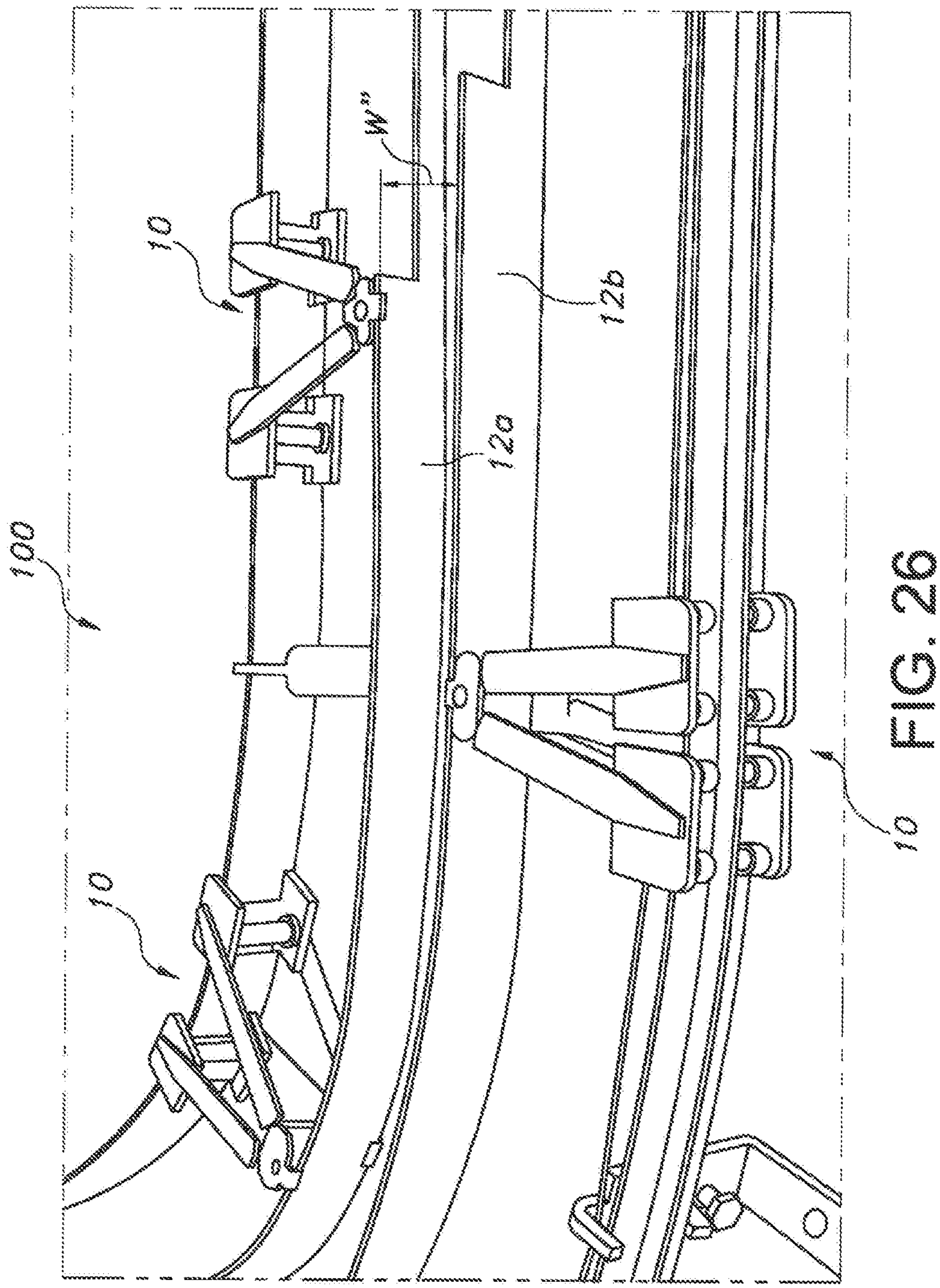
Figure 27:
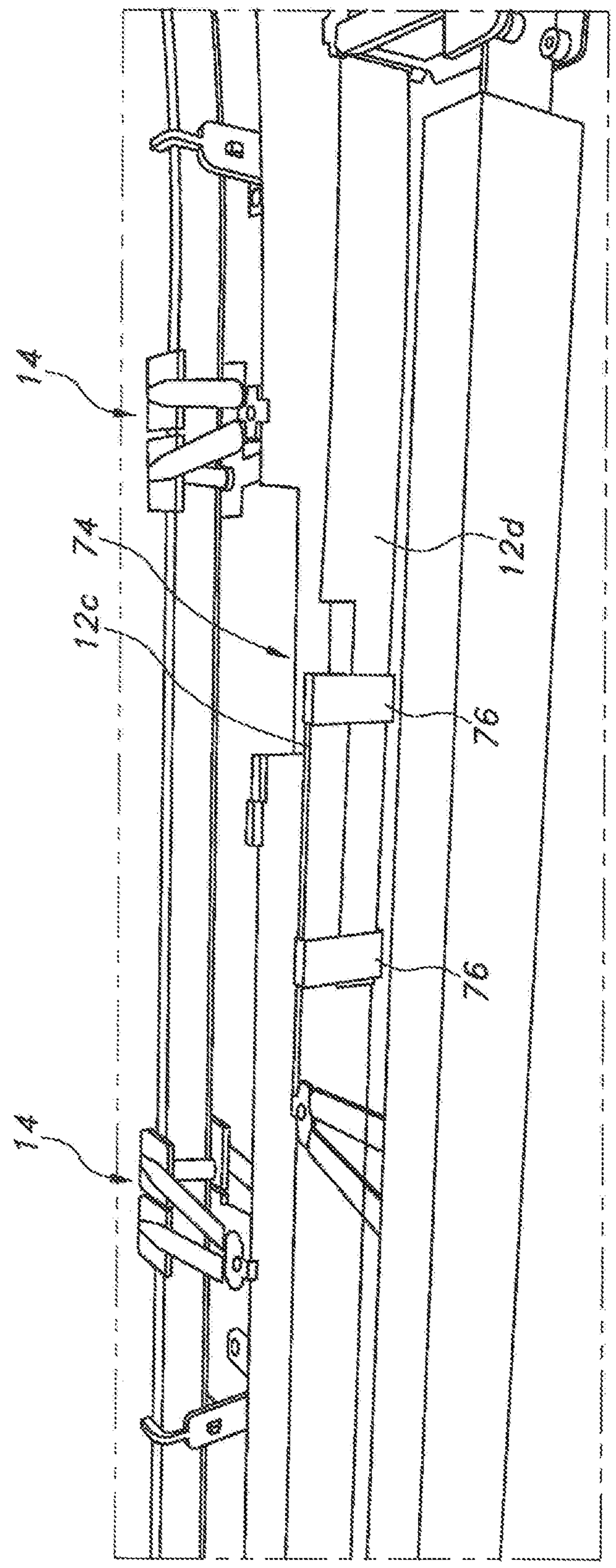
Figure 28:
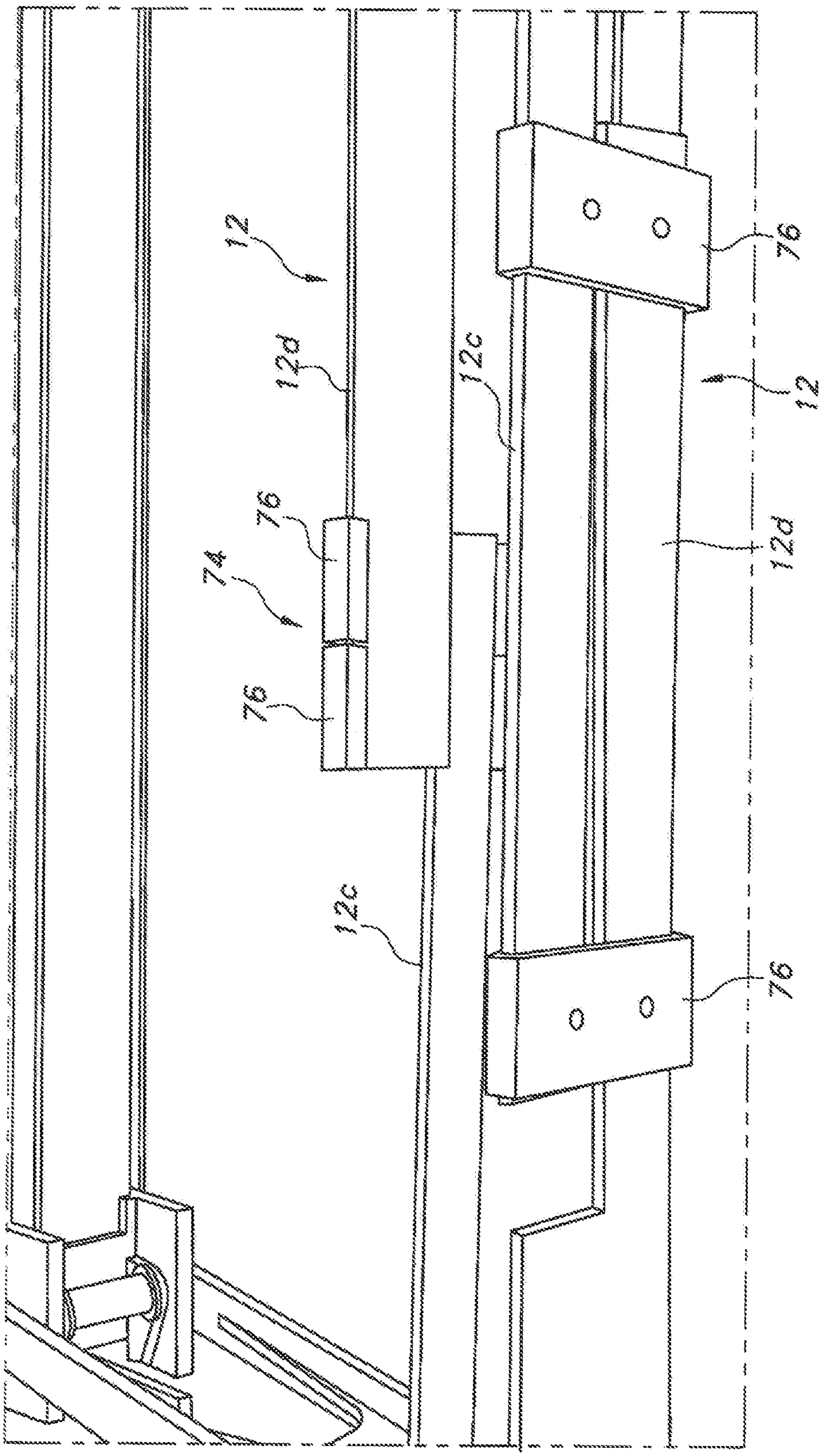
Figure 29:
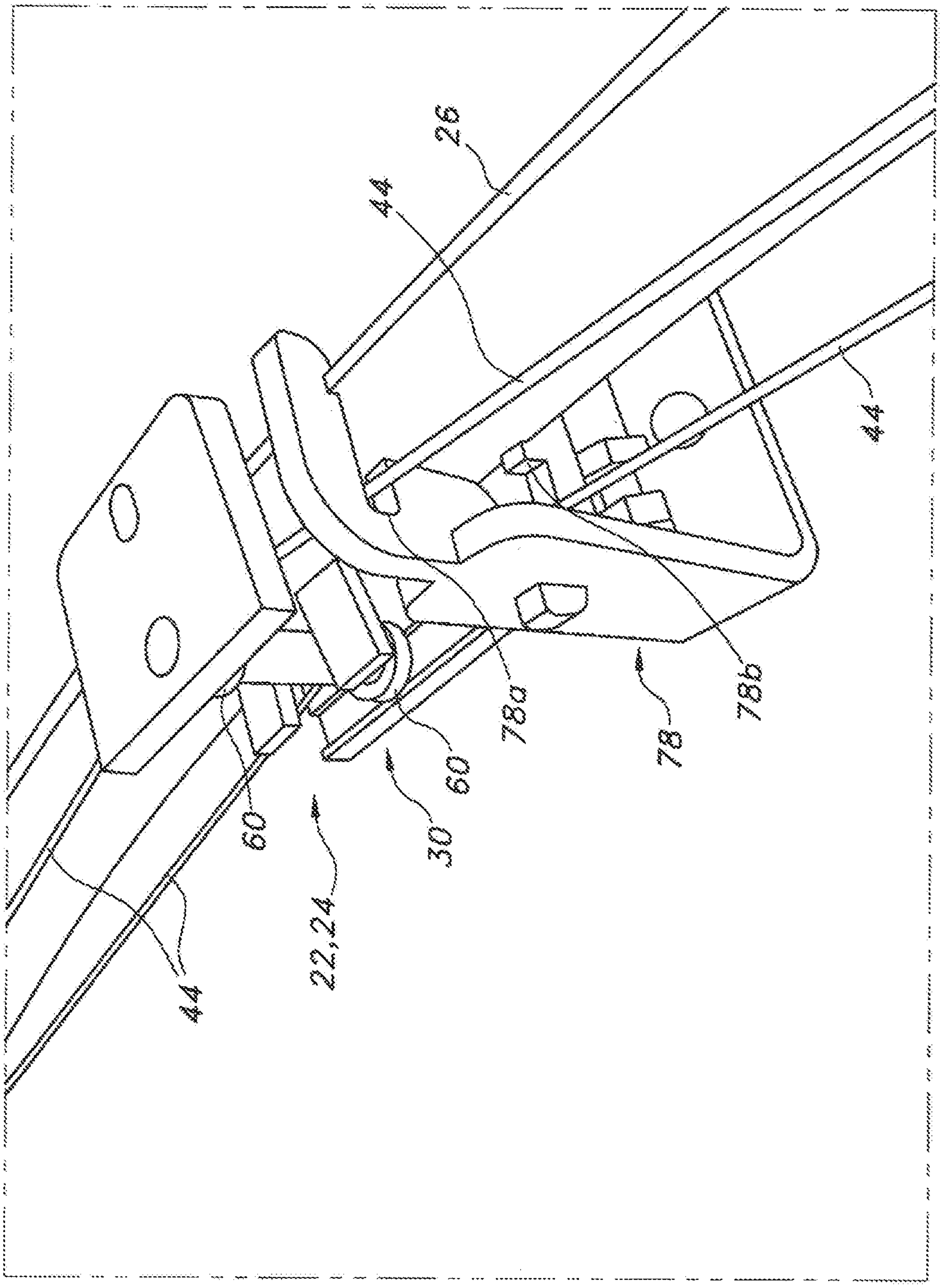
Figure 30:
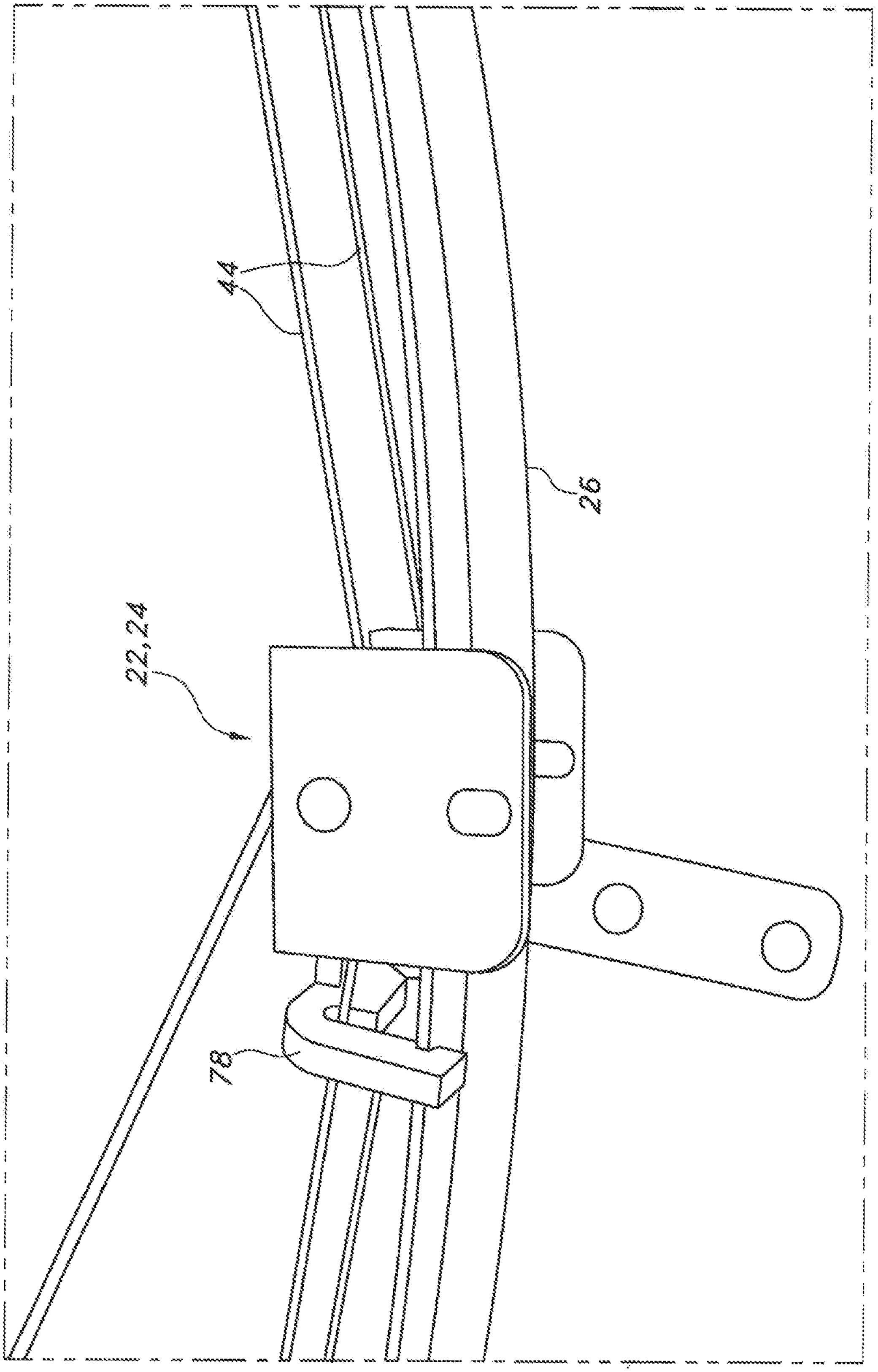
Figure 31:
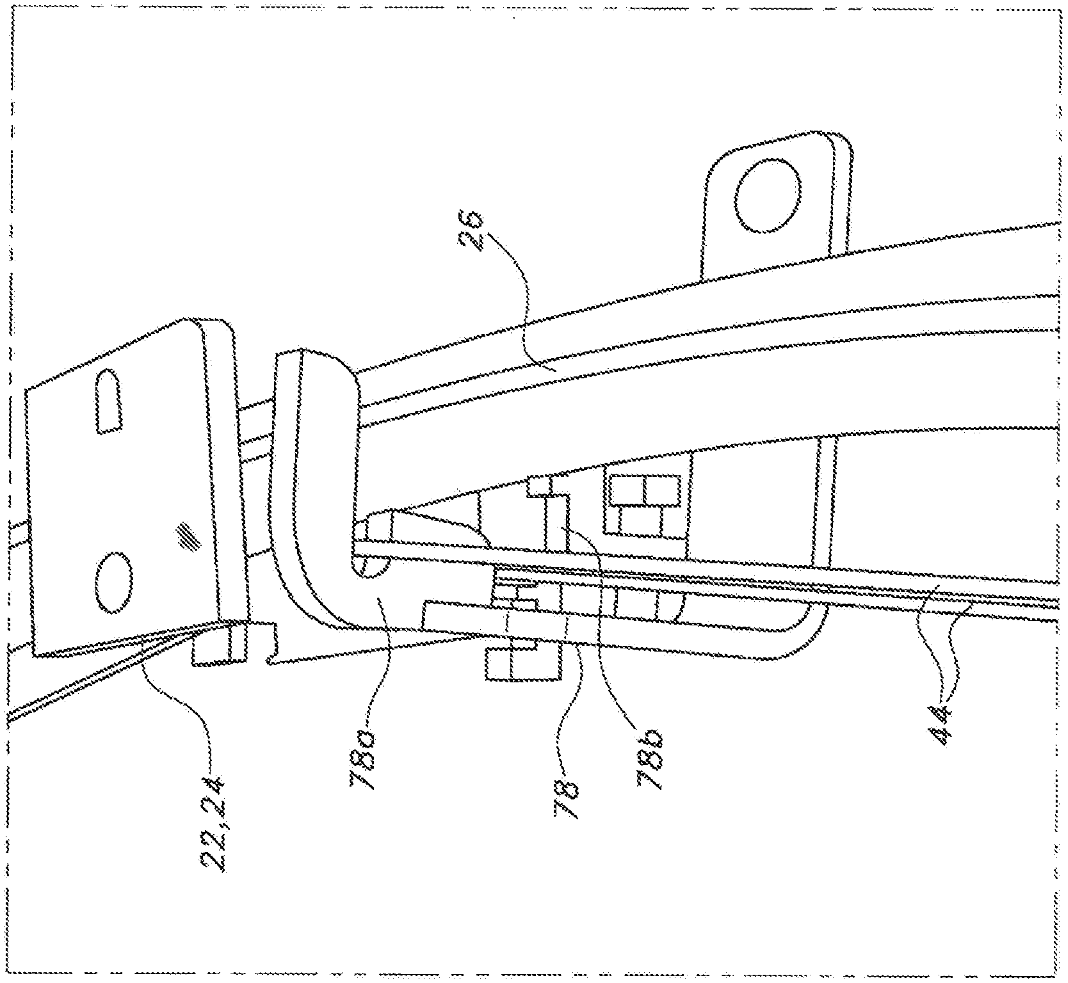
Figure 32:
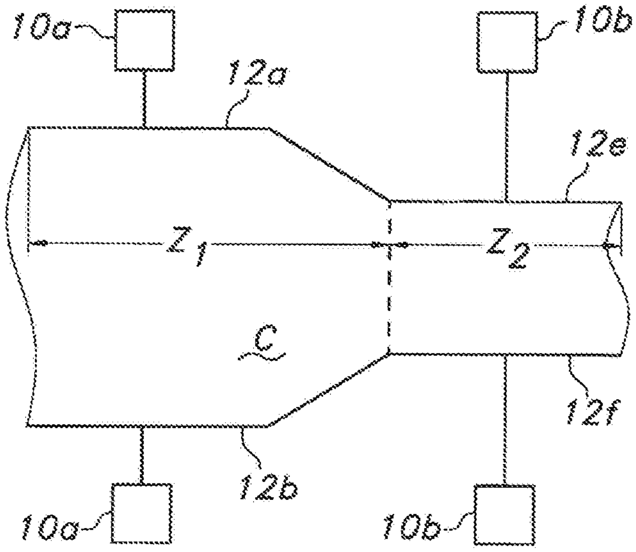
Figure 33:
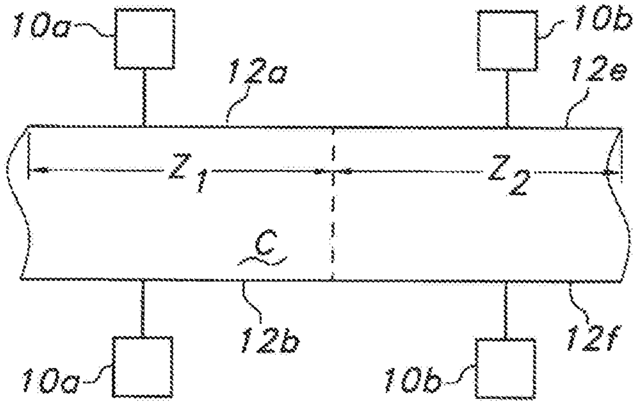
Figure 34:
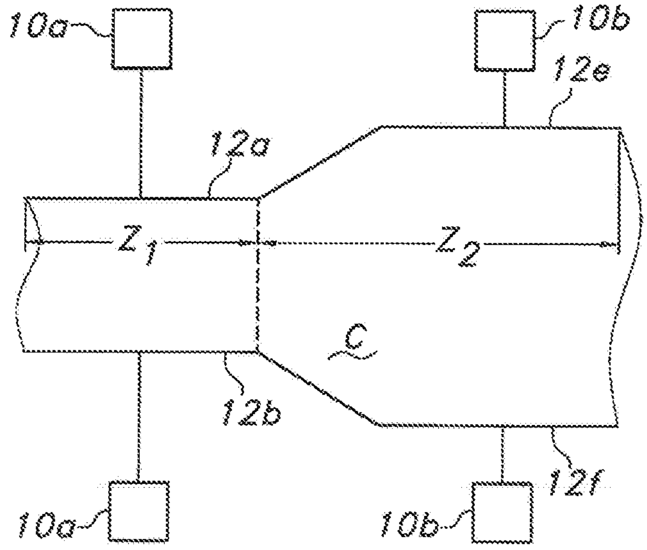
Figure 35A:
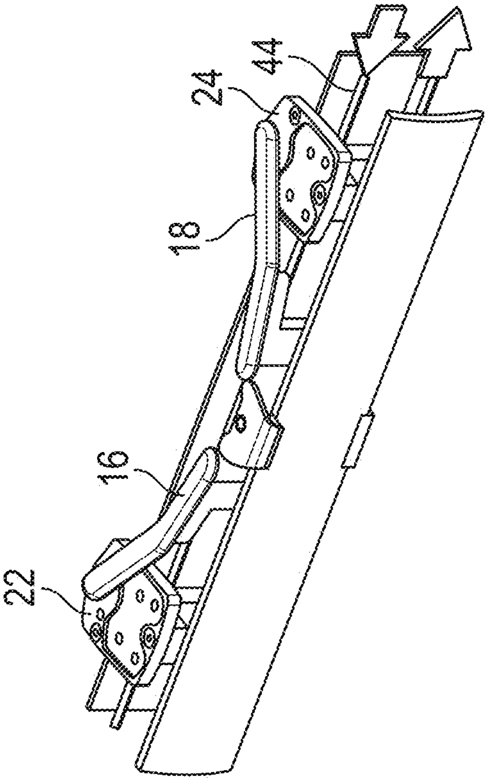
Figure 35B:
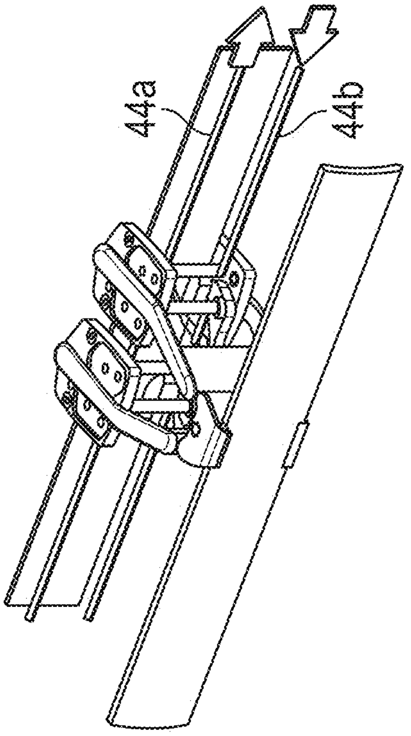
Figure 36:
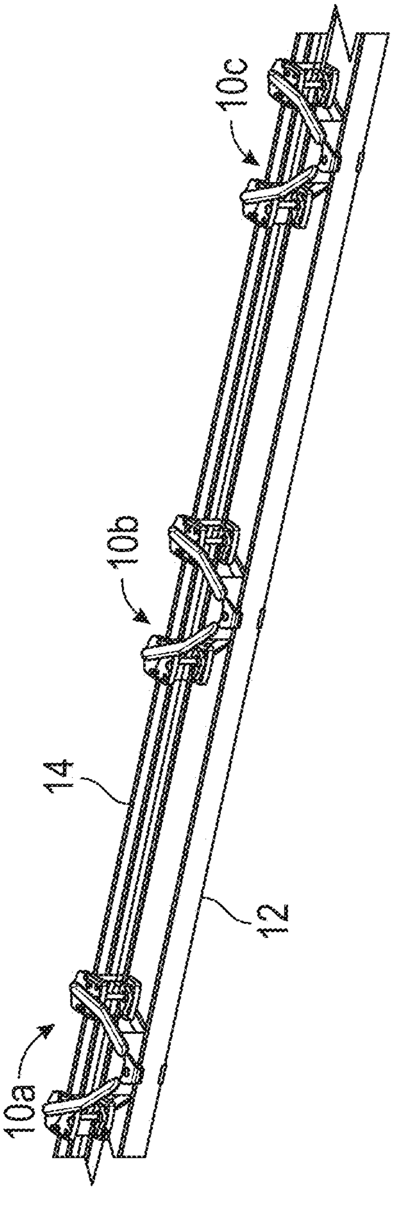
Figure 37:
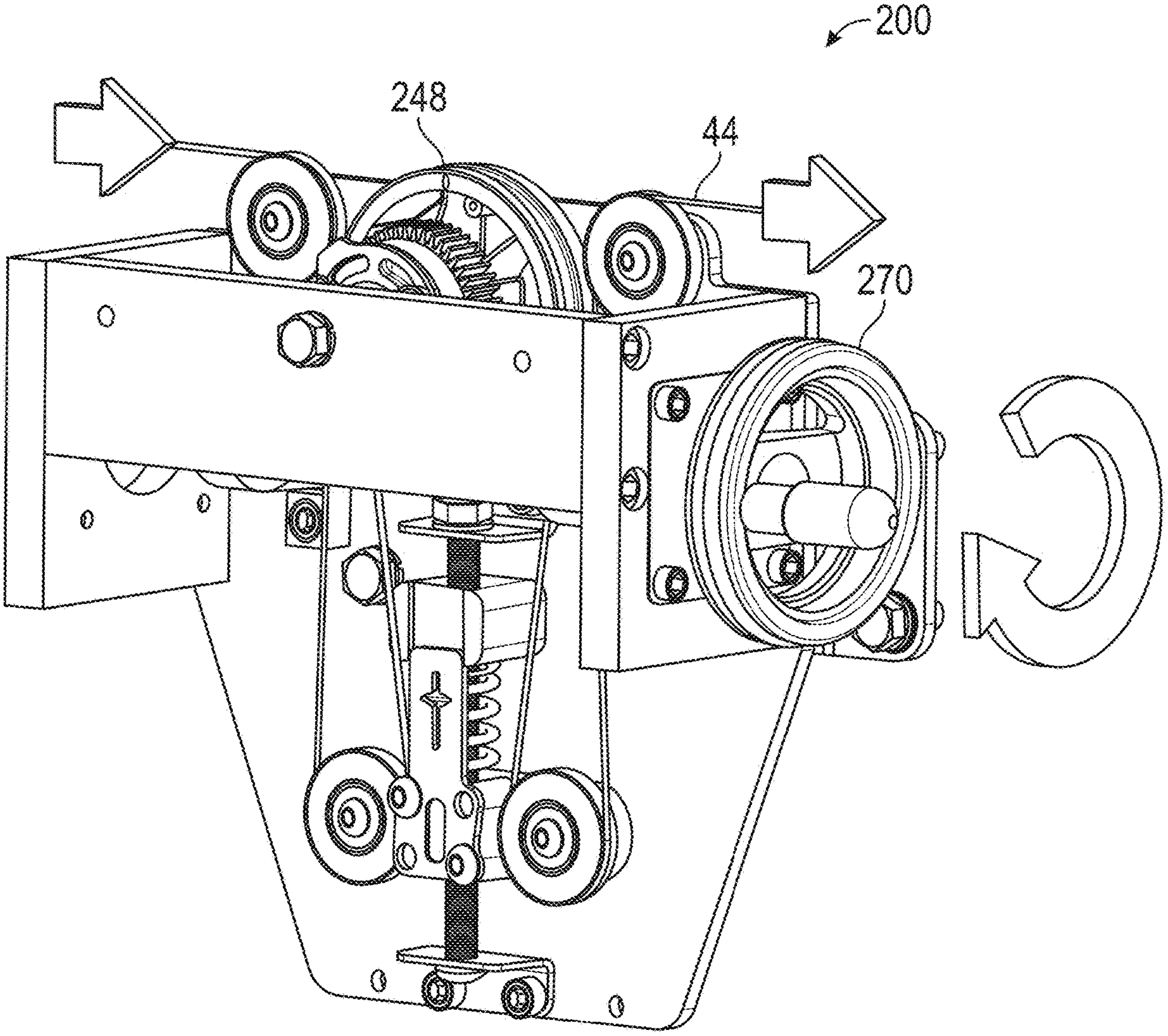
Figure 41:
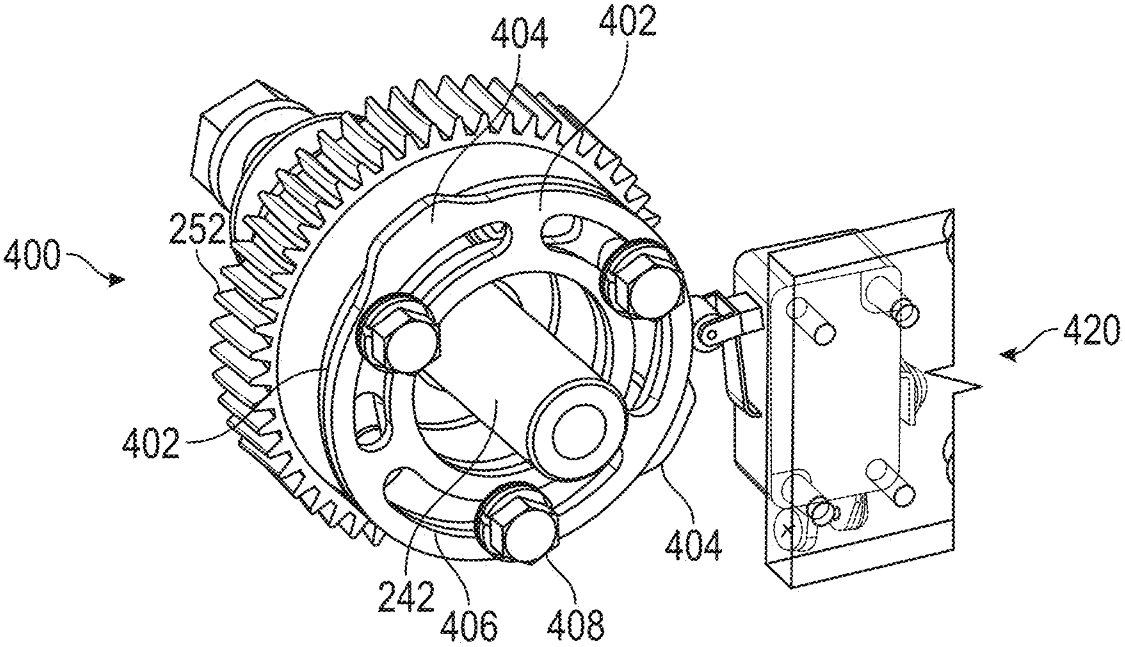
Figure 42:
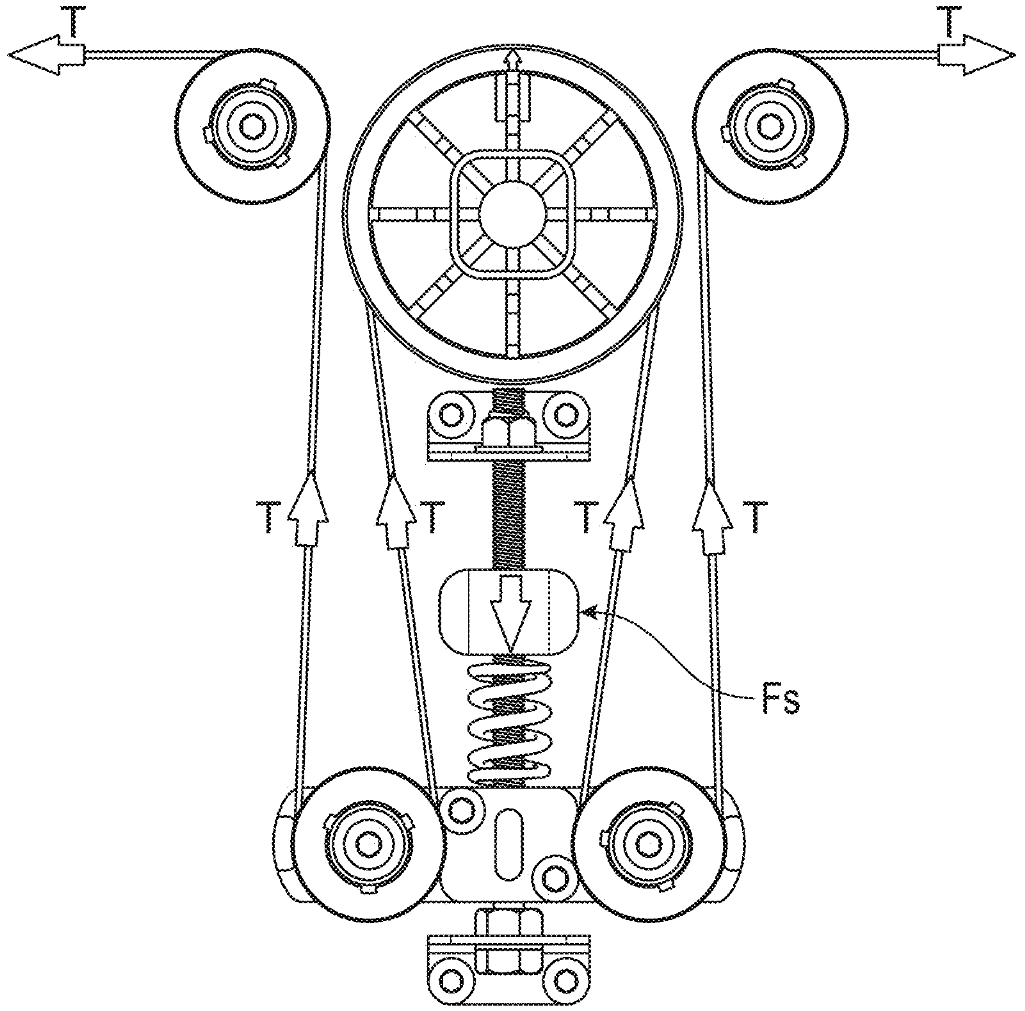
Figure 43:
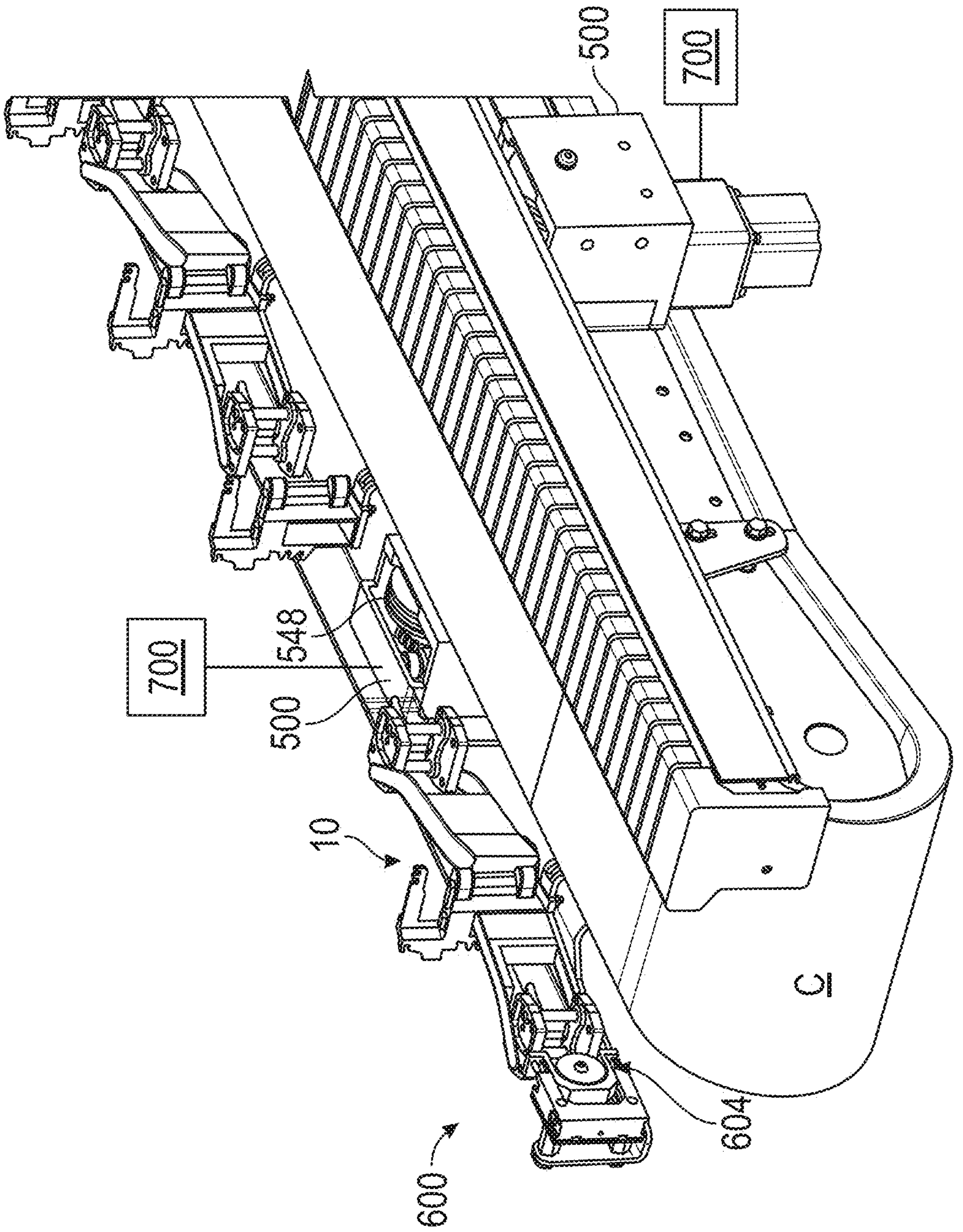
Figure 44:
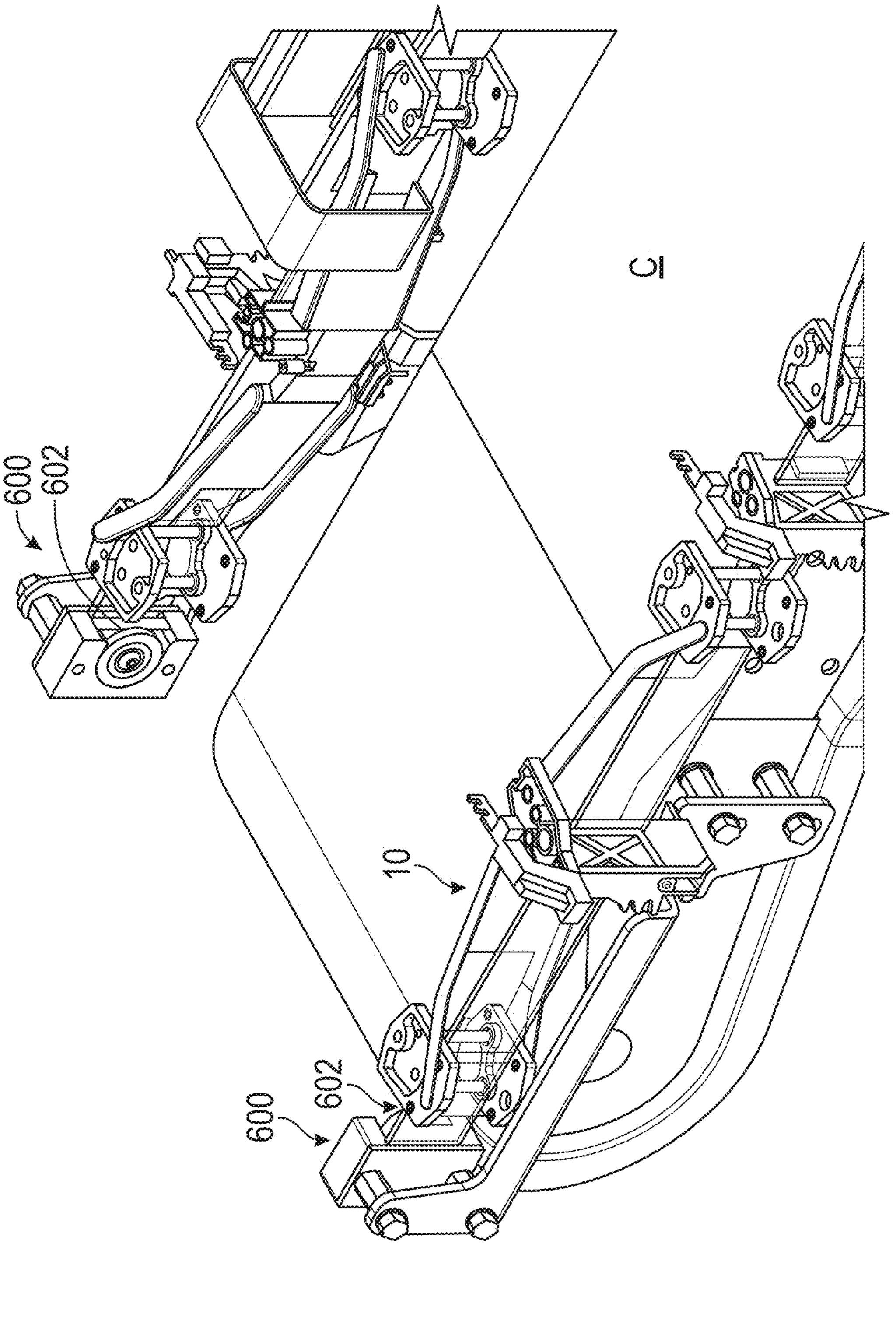
Figure 45:
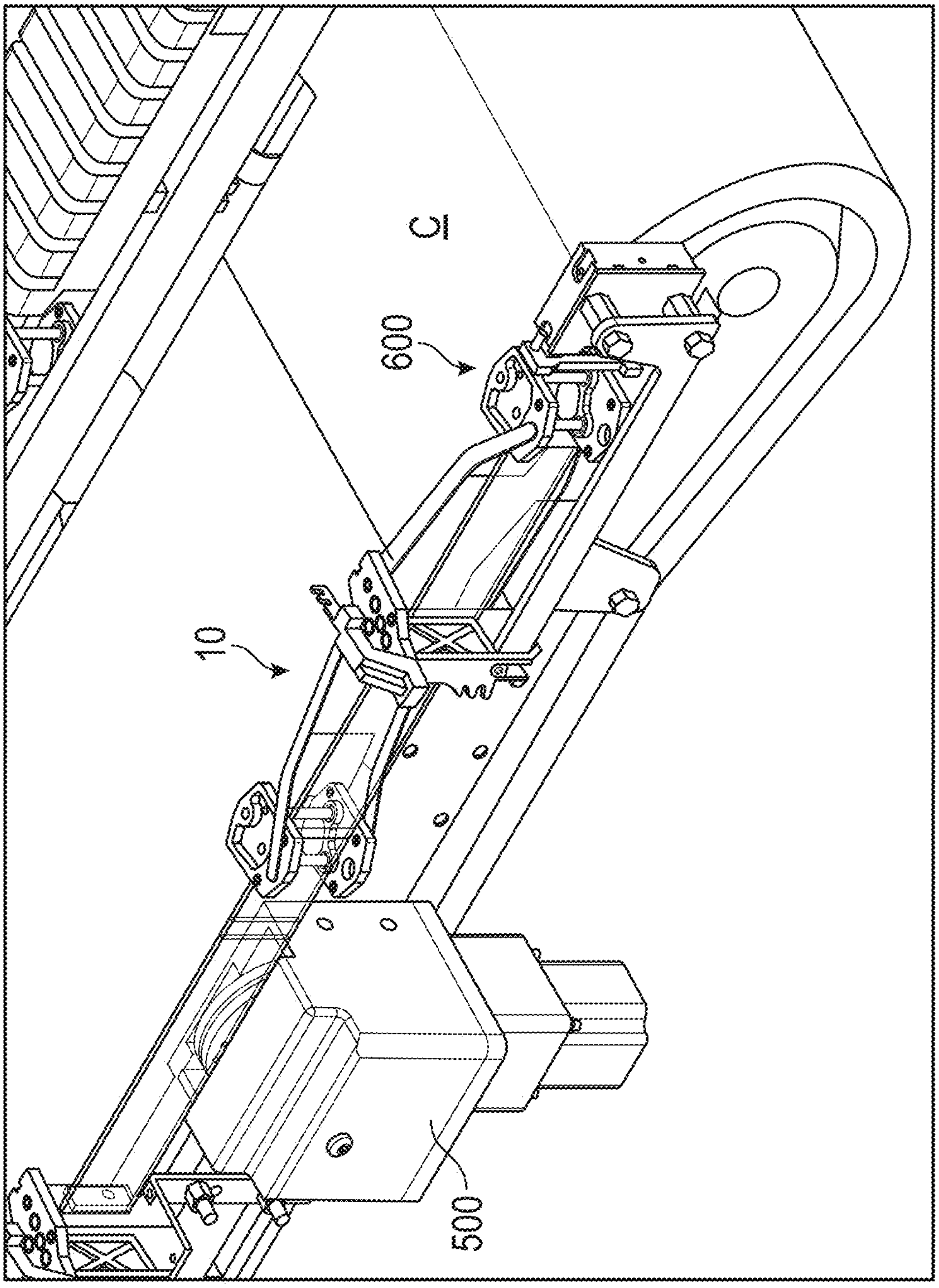

FIGS. 3, 4, and 5, are top, rear, and bottom views of the FIG. 1 adjuster;

FIG. 6 is a front view of the adjuster of FIG. 1;

FIGS. 7 and 8 are left and right side views of the adjuster of FIG. 1;

FIG. 9 is a perspective view of a collapsible guiderail support forming part of the adjuster of FIGS. 1-8;

FIG. 9A is an exploded view illustrating a manner of connecting an arm to one of the supports (shuttles) for pivoting movement;

FIG. 9B is a top view of the assembled configuration of FIG. 9A;

FIG. 9C is a cross-sectional view of the arrangement of FIG. 9A when assembled, taken along line 9C-9C of FIG. 9B;

FIGS. 10 and 11 are top views of the support of FIG. 9 in an extended and retracted condition;

FIG. 12 is a rear view of the support of FIG. 9;

FIG. 13 is a perspective view of a shuttle for connecting to the support for manual operation;

FIG. 14 is an exploded perspective view of the shuttle of FIG. 13;

FIG. 15 is a perspective view of a shuttle for connecting to the support for automated operation;

FIG. 16 is an exploded perspective view of the shuttle of FIG. 15;

FIG. 16A is a partially cross-sectional top view of the shuttle of FIG. 15;

FIG. 17 is a side view illustrating aspects of an actuator for actuating the adjustable guiderail support;

FIG. 18 illustrates a tensioner for a cable forming part of the actuator for the adjustable support;

FIGS. 19, 20, 21, 22 and 23 illustrate alternative forms of actuators;

FIGS. 24, 25, and 26 illustrate a system comprising two opposed guiderails associated with a plurality of adjusters;

FIGS. 27 and 28 illustrate various aspects of an extendable guiderail;

FIGS. 29, 30 and 31 illustrate guides for guiding an endless cable along a curved section of a support rail for the adjusters;

FIGS. 32, 33, and 34 are schematic views illustrating the creation of various zones using the adjustable guiderails according to the disclosure;

FIGS. 35A and 35B illustrate the extension and retraction of a guiderail by way of a cable;

FIG. 36 illustrates a plurality of adjusters attached to a single guiderail;

FIGS. 37-40 illustrate a cable actuator;

FIG. 41 is a rotational stop for the cable actuator;

FIG. 42 is a diagram; and

FIGS. 43-48 illustrate another embodiment of a cable actuator.

Reference will now be made in detail to certain embodiments of an adjustable guiderail and control system for a conveyor, examples of which are illustrated in the accompanying drawing figures.

DETAILED DESCRIPTION

With reference to FIGS. 1-9, one possible embodiment of a guiderail adjuster 10 forming one aspect of the invention is illustrated. As illustrated, the adjuster 10 may be adapted to connect with a guiderail 12 for guiding articles along a conveying path and in a conveying direction D (see, e.g., FIG. 19). The guiderail 12 may be supported by a support 14 forming a part of the adjuster 10, which may be flexible or collapsible (that is, able to be folded into a more compact shape). The adjuster 10 including the support 14 is thus capable of extending or retracting the guiderail 12 to change the relative position of the conveying path, without increasing the overall width of the associated conveyor in a transverse direction as a result of the adjustment.

In one embodiment, the support 14 may comprise links in the form of first and second supports or arms 16, 18 connected to each other. The arms 16, 18 are rigid in the vertical direction, but pivotally connected at their inner end portions, such as by a connector 20. The arms 16, 18 and connector 20 thus create a linkage (which may be in the form of a two bar linkage, but other forms could be used).

At the opposite end, each arm 16, 18 is connected to a structural part designed to reduce or eliminate friction or provide support or bearing. In the illustrated embodiment, this structure takes the form of a movable bolster or shuttle 22, 24 adapted to frictionally (by sliding or rolling) engage an elongated support rail 26, which extends generally parallel with the guiderail 12 in the conveying direction D. Consequently, these connections and the relative movement established allow for flexing or collapsing of the support 14 in a direction transverse to the conveying direction D.

The support 14 is also adapted to connect with the guiderail 12. In the illustrated embodiment, this is achieved by providing the connector 20 with one or more receivers, such as clips 20*a*, 20*b* (which as discussed in further detail below may provide engagement such that the guiderail 12 is fixed in position, or may be arranged to allow for relative sliding movement). As can be appreciated from FIG. 6, the arrangement is such that the overall adjuster 10 has a very low vertical profile, with a height only slightly greater than the height of the guiderail 12. As can be seen in FIGS. 1-8, an optional cover 28 may also be provided (removed in FIG. 9), which may engage the support rail 26 and provide a measure of protection for the movable parts of the adjuster 10, but without interfering with their relative movement and operation.

With reference to FIGS. 9 and 12, the nature of the pivoted connection of the arms 16, 18 forming the support 14 for the guiderail in one embodiment is shown. Each arm 16, 18 may be provided with a trunnion 16*a*, 18*a*, the ends of which are received and rotatably captured within upper and lower receivers 20*c* on either side of the connector 20. However, alternative configurations could be used, such as a simple hinge (with a mechanical pin or a living hinge). In any case, movement of the shuttles 22, 24 along the support rail 26 towards each other causes the connector 20, and hence, the associated guiderail (not shown) to move along an adjacent conveying surface in a direction transverse to the conveying direction. The movement is considered a flexible one, in that the pivoting of the arms 16, 18 relative to the connection allows flexing of the flexible joint thus formed.

Likewise, movement of the shuttles 22, 24 in the opposite direction (farther away from each other) causes the arms 16, 18 to flex relative to each other (and connector 20) and thereby retract the guiderail 12.

Allowing the arms 16, 18 forming the linkage to reach a "bottomed out" (β=180 degrees or more) and potentially locked position may be undesirable (especially when the actuation of the adjusters 10 is automated, as compared to manual). Thus, as can be appreciated from FIGS. 10 and 11, this condition may be avoided by providing the side of the connector 20 opposite the guiderail 12 with a protrusion or extension 20*d* projecting transverse to the conveying direction, which thus serves to define the maximum flexing of the joint formed between the arms 16, 18. This protrusion or extension 20*d* of the connector 20 may be sized and positioned to engage the support rail 26 in the fully collapsed position of the linkage, and thus prevent it from bottoming out and becoming locked in position. Of course, the protrusion could also be provided on one or both of the arms 16, 18, or even on the support rail 26, to achieve a similar result.

As can be appreciated with reference to FIGS. 10, 11, and 12, by way of being selectively extended or retracted, the support 14 creates an enhanced level of adjustability for an associated guiderail 12. The adjustments may be achieved in an easy and efficient manner, and without remarkably increasing the footprint of the overall conveyor system. Specifically, extending or retracting the support 14 allows the guiderail 12 pivotally attached thereto by virtue of connector 20 to be configured to provide a variable width conveying path for a number of differently sized articles to be conveyed. For example, when a smaller sized article is desired to be conveyed, the guiderail 12 need only be moved in an inward or inboard direction I transverse to the conveying direction D, thereby causing it to collapse in this direction (and thus causing the flexible joint to assume an acute angle α, such as for example as little as 5 degrees in the illustrated example, and possibly lower in the event the arms 16, 18 may be arranged parallel to each other)). In other words, the arms 16, 18 move from a position where the relative angle between them is greater to one in which it is reduced or smaller. This narrows the conveying path, and thus allows for a readily customizable arrangement for guiding a variety of differently sized articles.

Likewise, if it is desired to convey a larger sized article/object or otherwise extend the width of the conveying path relative to the underlying conveyor, the guiderail 12 need only be moved in an outward or outboard direction O transverse to the conveying direction D (and thereby flexing the joint so as to create a large, obtuse angle β between the arms 16, 18, which may be up to but not including 180 degrees, and as shown is limited by the presence of the protrusion 20*d* to prevent a lock out condition). In other words, the arms 16, 18 move from a position where the relative angle between them is smaller to one in which it is greater. In all cases, it can be appreciated that no rod or like structure projecting outwardly from the support rail 26, and thus the overall width of the arrangement does not change as a result of the extension or retraction. The resulting conveyor system may thus have a smaller footprint than would otherwise be the case if transversely extending rods and corresponding mounts were utilized.

The adjustment of the support 14 may be manually or automatically done. In the manual version, and with reference to FIGS. 13 and 14, each shuttle 22, 24 may be provided with a retainer 30 for use in selectively engaging the support rail 26 and thereby holding the shuttle in the desired position. In the illustrated embodiment, the retainer 30 comprises a post 32 supporting a pivotally mounted lever 34, such as by way of snap-fit engagement with a clip 32*a*. The inside of the lever 34 includes a wedge 36, which is sized and positioned for not engaging the rail 26 in one position, but frictionally engaging it in a different position (note positions 34' (free) and 34" in FIG. 9 (retained)). Opposed plates 38, 40 may be retained by a fastener F to hold the post 32 in position, and each plate 38, 40 may include a guide 42 for slidably receiving a portion of the support rail 26. The plates 38, 40 may also include apertures 38*a*, 40*a* for receiving a corresponding fastener (such as a keyway plug 16*c*; see FIGS. 9A, 9B, and 9C) depending from a proximal end of each arm 16, 18 for pivotally connecting the ends of the arms 16, 18 with the shuttles 22, 24.

As can be appreciated, by disengaging the retainer 30 using lever 34, the associated shuttle 24 is free to move to and fro, such as by sliding, along the support rail 26, and thereby extend or retract the support 14 and, hence, the associated guiderail 12. When a position is reached corresponding to the desired extension or retraction of the guiderail 12, the retainer 30 may be reactivated to establish fixed engagement with the support rail 26. As can be appreciated, it is only necessary to move one of the shuttles 22, 24 to achieve the desired extension or retraction of the guiderail 12 in view of the collapsible nature of the support 14 created by the pivotably connected arms 16, 18.

The shuttles 22, 24 may also be readily adapted to work in an automated environment. Specifically, at least one, and potentially each shuttle 22, 24 may be adapted to engage an actuator for causing movement to and fro along the support rail 26, depending on the degree of actuation, and thus extending or retracting the arms 16, 18. As shown in FIG. 17, the actuator may comprise a connector for connecting with the shuttles 22, 24, such as a flexible cable 44. For purposes of this disclosure, in addition to the normally understood definition of the word, the term "cable" may also refer to any flexible line or strap such as a rope, a chain, a strap of nylon or other polymer, a wire, or other corded material, whether metallic or non-metallic. The cable 44 may extend over pulleys 46 at each end (only one shown in FIG. 17 mounted to one end of the support rail 26, but the arrangement would essentially be the same as shown at the opposite end of the support rail 26; see, e.g., FIG. 19). The arrangement thus forms an endless loop (which may be associated with plural adjusters 10, as outlined further in the following description).

To cause the cable 44 to traverse the endless path, it may be entrained around a driver, such as capstan 48, which may be associated with a motor 50 (e.g., a servomotor) also forming part of the actuator in this embodiment. As shown in FIG. 18, the cable 44 may also be provided with a tensioner, such as a turnbuckle 45, to allow for the tension to be adjusted as necessary or desired.

In this example, and with reference to FIG. 16, each plate 38, 40 may be provided with a retainer 52 for selectively engaging the cable 44. The retainer 52 may comprise a clamp in the form of a pivotable cam 54 (only upper one shown in FIG. 16), but could take other forms as well (e.g., a bolt with a flange for capturing a portion of the cable 44 against a corresponding surface of the shuttle). The cam 54 may be journaled on a reduced diameter end 56*a* of a post 56, which may be held in place by a fastener F.

In the illustrated example, and with reference to FIGS. 16 and 16A, the cam 54 includes an enlarged, rounded inner face 54*a* for engaging and pressing the cable into engagement with a frictionally enhanced portion 55 of the plate 38, 40 (which may be identical, but inverted; in other words, plate 38 is identical in form to plate 40 in FIG. 16, so it can be understood that the upper plate includes frictionally enhanced portion 55), and a free end 54*b* adapted for tactile engagement for movement between the hold and release position. A lock, such as a removable locking tab 58 with flexible legs for engaging a projection 58*a* in a snap fit engagement, may also be provided for engaging and fixing the cam 54 in the locked or closed condition, thus engaging the cable (shown in phantom line in FIG. 16A). A roller or pulley 60 may be rotatably journaled at the opposite, reduced diameter end 56*b* of post 56 (upper when the cam 54 is at the lower plate 38; lower when the cam 54 is at the upper plate 38, as shown in FIG. 16).

As can be appreciated, the cable 44 has a forward run and a return run in view of the endless loop established. By connecting one shuttle 22 to the upper run using the clamp (cam 54) located as shown in FIG. 16, and connecting the other shuttle 24 to the return run using a clamp (cam 54 on plate 40, as per FIG. 16A) at a corresponding location, actuation using a single actuator thus causes the shuttles 22, 24 to move toward or away from each other, thereby flexing the joint of the support 14 created by arms 16, 18 and extending or retracting the guiderail 12. The alternate run of the cable 44 that is not fixed to the shuttle 22, 24 simply engages the roller/pulley 60, and thus does not impede the relative movement.

With continued reference to FIG. 16, each shuttle 22, 24 may also be provided with rollers 62 to create low-friction engagement with the support rail 26. The rollers 62 may comprise individual rollers 62*a* connected to the plates 38, 40 by fasteners 64 and arranged for engaging an outer face of the support rail 26, as well as rollers 62*b* journaled in the plates 38, 40 for engaging the inside face of the support rail 26. As can be appreciated, the spaced rollers 62*a* allow for a portion of the rail 16 to pass for engaging and supporting the cover 28.

Figure 19:
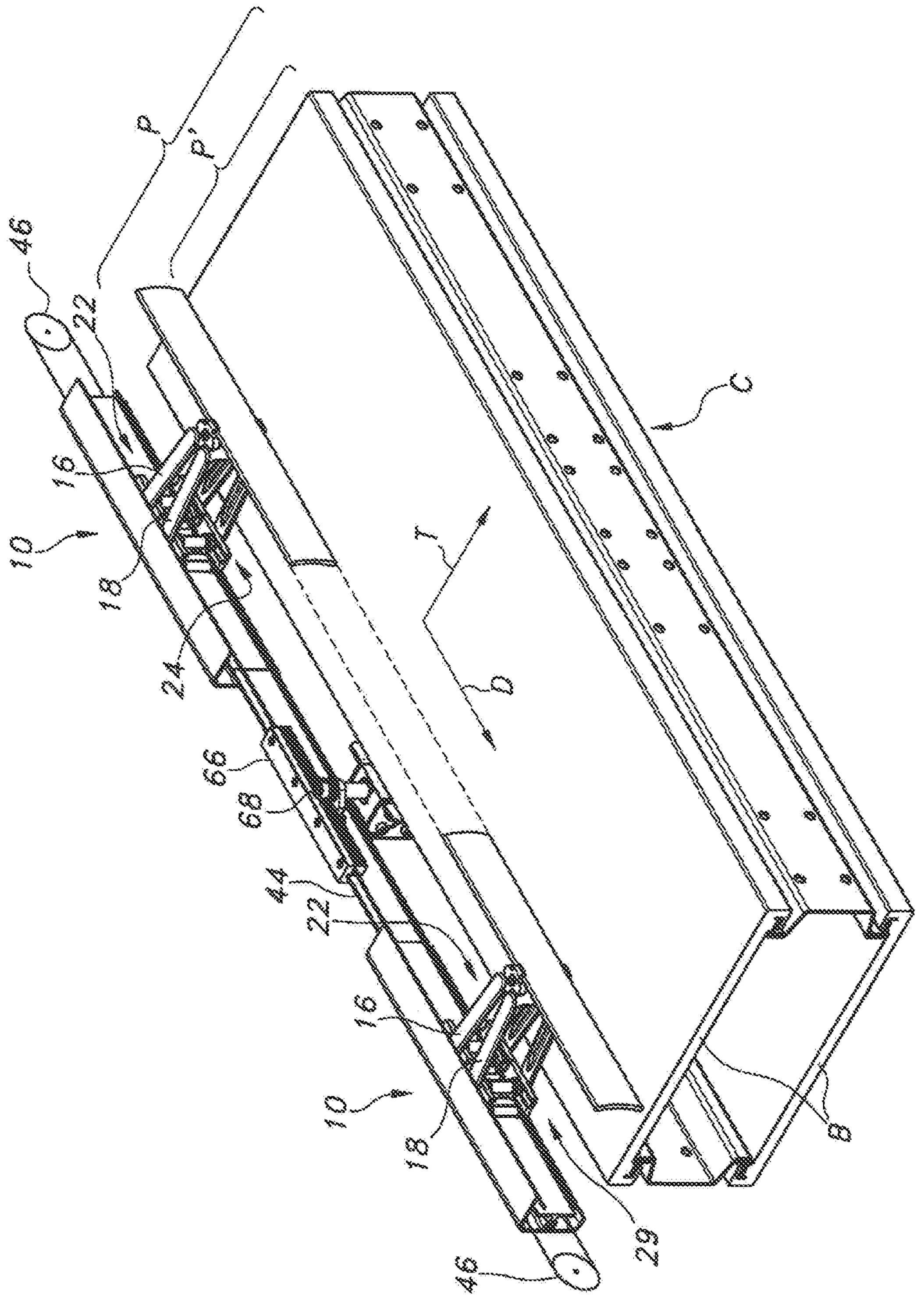

Alternative forms of actuation are possible, which advantageously may use a single actuator for activating plural adjusters 10 for adjusting the width of the conveying path. For example, as shown in FIG. 19, the connector, such as cable 44, may be associated with a rack 66, which is arranged for engaging a rotatable pinion 68. In view of the endless nature of the cable 44, and the corresponding connections with the shuttles 22, 24 as described above, actuation of the pinion 68 in one direction causes the simultaneous actuation of plural adjusters 10. This advances the guiderail 12 (shown as two disconnected portions with phantom portion for purposes of illustration) in the transverse direction T of the conveyor C (which as indicated has a conveying path P formed by a conveying surface (chain or belt B) in the conveying direction D, and note reduced width path P' as a result of the advance of the guiderail 12 in the transverse direction). Specifically, rotating the pinion in a clockwise direction moves the rack to the right in FIG. 19, and in view of the connection of the forward run of the cable 44 with shuttles 22 of each guiderail adjuster 10, and the return run with shuttles 24, causes the advancement illustrated. Reversing the direction of rotation of pinion 68 causes the opposite movement to occur.

Figure 20:
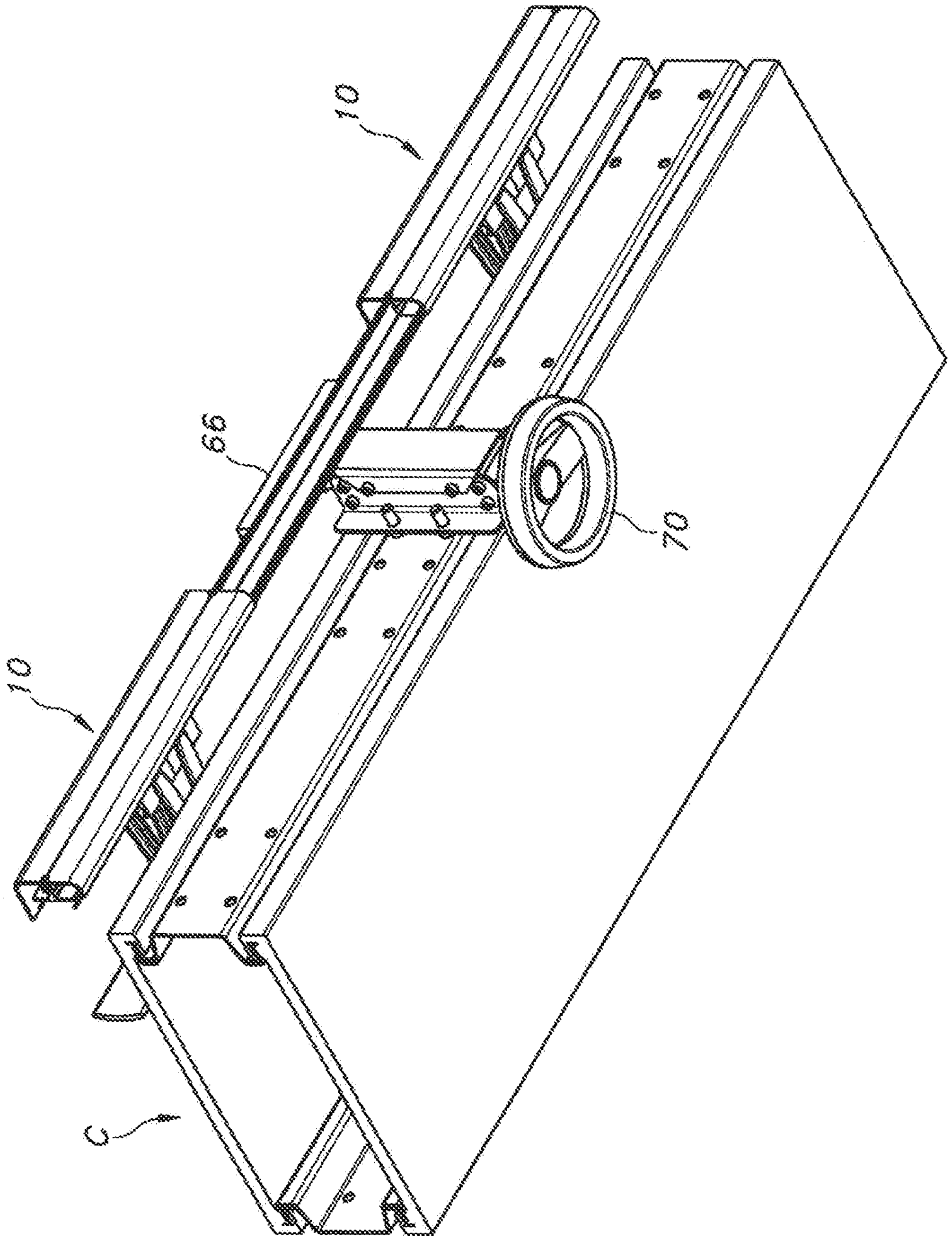
Figure 21:
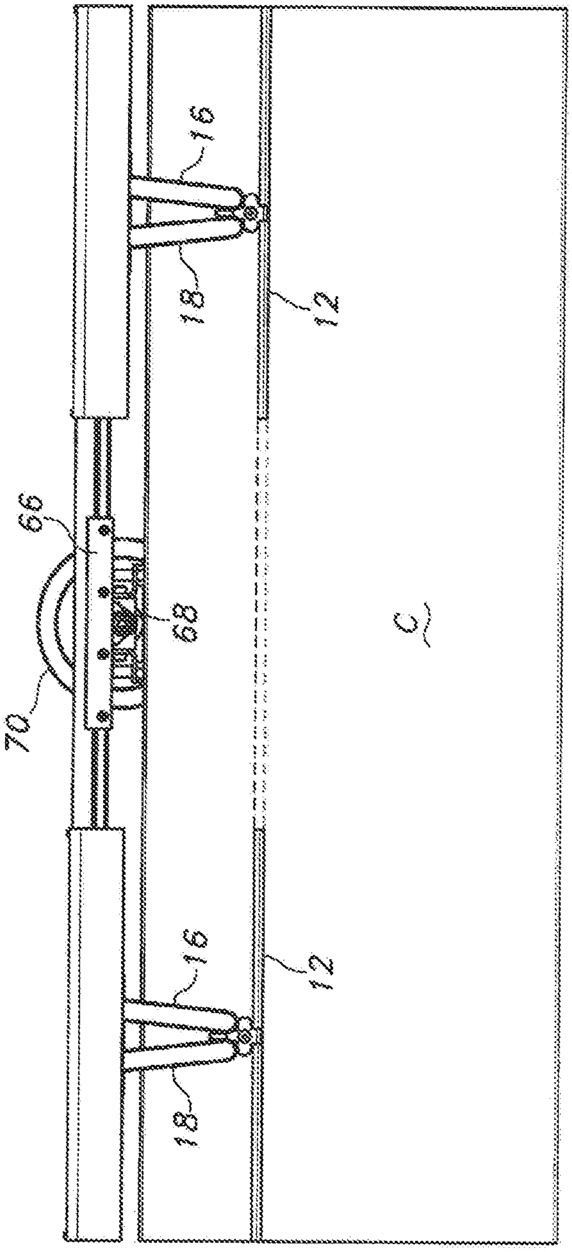
Figure 22:
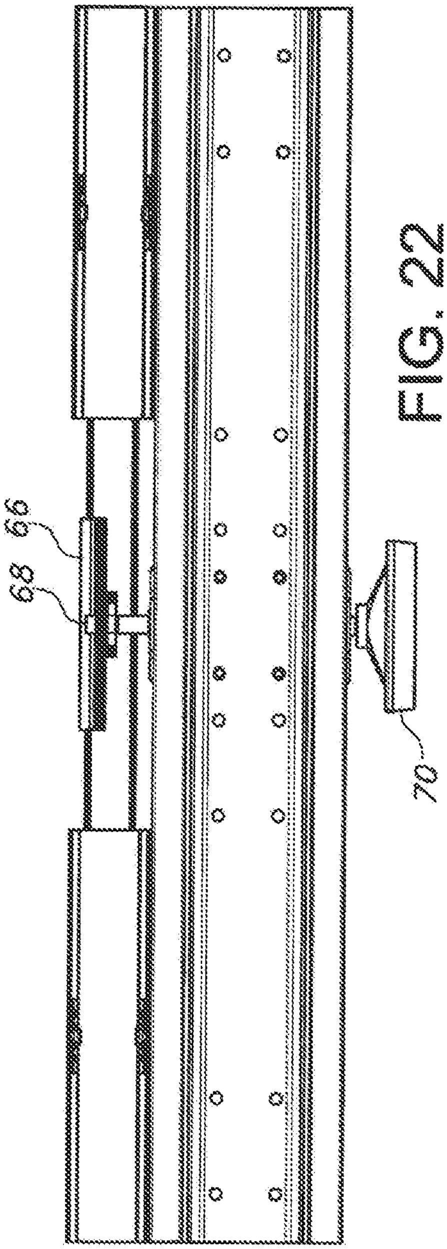
Figure 23:
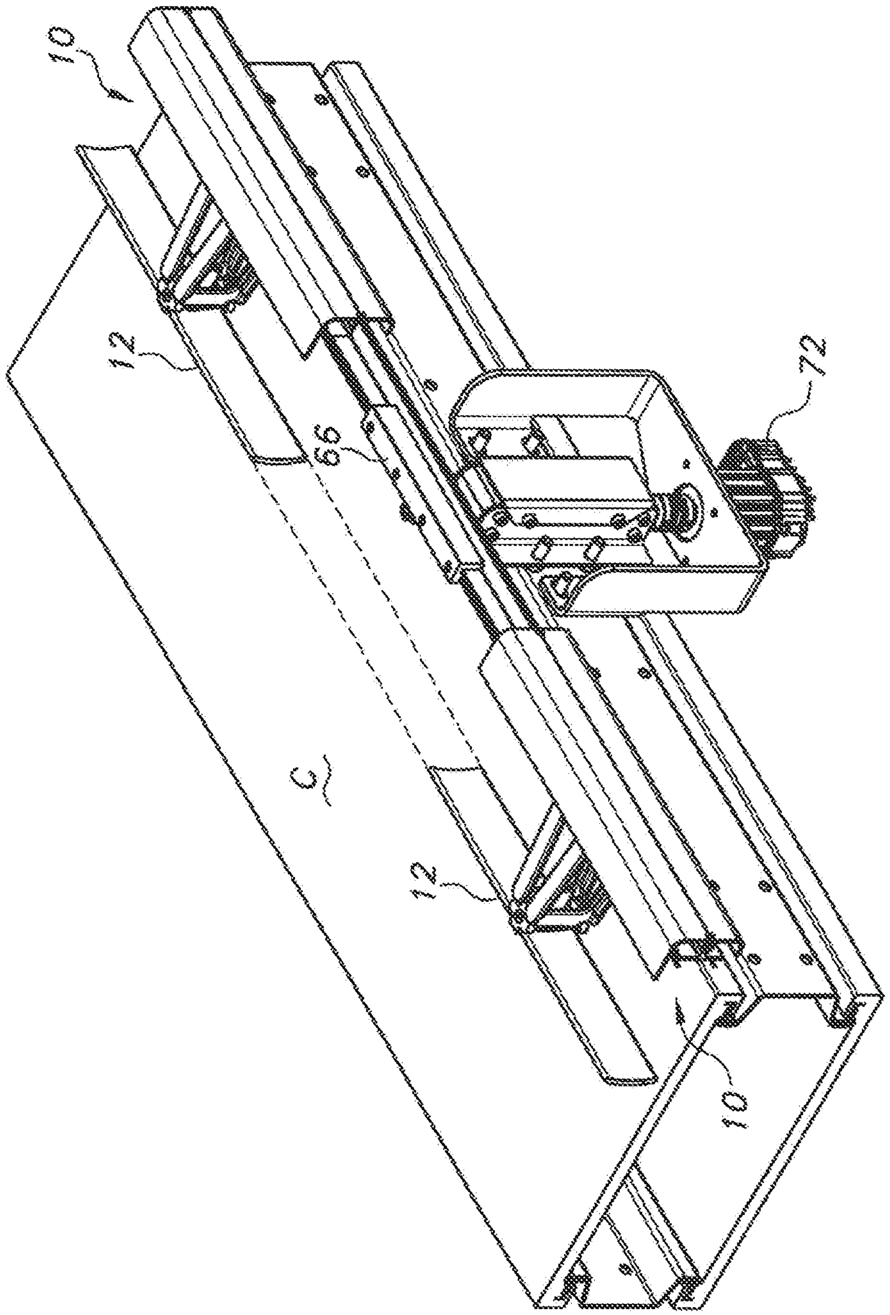

The actuation of the adjusters 10 associated with the conveyor C may again be manual or automated. Thus, as shown in FIGS. 20-22, a hand wheel 70 may be connected to the associated conveyor C and rotated to cause the actuation of one or more of the adjusters 10 (basically, as many as are connected to a single connector or cable 44, which could be any number (2, 5, 10, 20 or more), depending on the strength of the actuator arrangement used. FIG. 23 illustrates the use of a motor 72 (e.g., servomotor) for automated operation.

FIGS. 24-26 illustrate an overview of a possible arrangement of the adjustable guiderail support system 100 incorporating a plurality of adjusters 10 for use in connection with a conveyor having a conveying path (not shown). Opposed inner and outer guiderails 12*a*, 12*b* are shown for guiding articles (not shown) along the conveying path. The adjustable guiderail supports 14*a*, 14*b* are supporting inner guiderail 12*a* and the adjustable guiderail support 14*c* is supporting outer guiderail 12*b*. Thus, if it is desired adjust the conveying path width W to accommodate differently sized articles (or groups thereof), guiderail 12*a* (along with guiderail supports 14*a*, 14*b*) and guiderail 12*b* (along with guiderail support 14*c* and any others present) may be moved. The movement may again be manual or automatic using a single actuator (including cable 44) transverse the conveying direction D along each support rail 26 (with an associated motor, the operation of which may be coordinated by a single controller) in order to widen or narrow the conveying path width W (note smaller width W' in FIG. 25, and even smaller width W" in FIG. 26, which may correspond to a single row of articles being conveyed, such as bottles or cans). In such situations, it may be desirable to have the receivers (e.g., clips 20*a*, 20*b*) firmly engage the guiderail 12*a*, 12*b* at every other adjuster 10, but slidably engage at others, to allow for the desired extension and retraction.

FIGS. 27-28 illustrate that the guiderail 12 may comprise an extendable joint 74 comprised of portions, such as legs 12*c*, 12*d*, having a reduced vertical dimension (basically each equal to one half of the overall guiderail height). These legs 12*c*, 12*d* may overlie each other or overlap in a vertical direction, and are slidably received in receivers 76, which may take the form of C-shaped clamps that allow for relative movement of the legs (toward a common center during retraction of the guiderail 12 and away from it during extension). The receivers 76 thus retain the legs 12*c*, 12*d* together, yet capable of relative movement in the conveying direction during extension and retraction of the associated guiderail portions. This allows for the guiderail 12 to provide the desired extension and retraction, such as via supports 14, to accommodate a particular article being conveyed or form a particular conveying path. Hence, one or both of the legs 12*c*, 12*d* may be curved, but use of the supports 14 in connection with straight portions that are connected by the extendable joints is also possible. It can also be appreciated from FIG. 28 that the extendable joints 74 allow for opposing guiderails 12 to extend or retract different amounts, which may occur when one is associated with an inside curve and the other with an outer curve.

Depending on the size or shape of the underlying conveyor C, it may also be desirable to provide a guide intermediate the adjusters 10 for guiding the connector, such as cable 44. As shown in FIGS. 29-31, this may be achieved using the manual shuttle 22 or 24 of FIGS. 13 and 14, which may be equipped with pulleys 60 for engaging the upper and lower runs of the cable 44. The shuttles 22, 24 may be selectively positioned using the associated retainers 30. Stationary brackets 78 may also be provided with upper and lower guides 78*a*, 78*b* for guiding the respective runs of the cable 44.

FIGS. 32-33 schematically illustrate a possible application of the adjusters 10 to create zones of different widths in a single conveyor or conveyor system (e.g., comprised of multiple conveyors). As shown in FIG. 32, a first series of adjusters 10*a* associated with an underlying conveyor C may be used to provide an upstream portion of the conveyor with guiderails 12*a*, 12*b* spaced farther apart, thus forming a first zone Z1, and a second series of adjusters 10*b* may be used to place downstream guiderails 12*e*, 12*f* spaced closer together, thus forming a second zone Z2. The adjusters 10*a*, 10*b* may be manually adjusted, or associated with different actuators (e.g., a cable system, as described above). Later in time, as indicated in FIG. 33, the adjusters 10*a*, 10*b* may be altered to make the zones Z1, Z2 the same width, or for zone Z2 to be wider than zone Z1, as indicated in FIG. 34. As can be appreciated, the material of the guiderails 12*a*-12*b* may be flexible or include flexible interconnections (including the joints 74 described above) to allow for the relative movement, which is exaggerated in the schematic figures for purposes of illustration).

As described above, and as shown in the example of FIGS. 35A-35B, each individual adjuster 10 may include a single support 14, a single pair of support arms 16, 18, and a single pair of shuttles 22, 24, all adapted to extend and retract a single guiderail 12. This individual adjuster 10 may be individually actuated by way of a cable 44. The cable 44 may be an endless path or a continuous loop, and may include a first track such as top track 44*a* and a second track such as bottom track 44*b*. One or more retainers 52 may be provided in association with at least one of the shuttles 22, 24 for selectively engaging the cable 44. One or more rollers/pulleys 60 may be provided for guiding at least one of the shuttles 22, 24 along the cable 44. For example, a first shuttle 22 may include a retainer 52 at the top of the first shuttle and a roller/pulley 60 on the bottom of the first shuttle, while a second shuttle 24 may include a retainer 52 at the bottom of the second shuttle 24 and a roller/pulley 60 on the top of the second shuttle.

In another embodiment, as illustrated in FIG. 36, a plurality of adjusters 10*a*, 10*b*, 10*c*, may each include respective support arms and shuttles. Each of the plurality of adjusters 10*a*, 10*b*, 10*c*, may be connected to a single support 14. Each of the plurality of adjusters 10*a*, 10*b*, 10*c*, may be adapted to extend and retract a single guiderail. In one aspect, each of the plurality of adjusters 10*a*, 10*b*, 10*c*, may be actuated by way of a single cable 44.

In a further aspect of the disclosure, FIGS. 37-40 illustrate a cable actuator 200, which is adapted for selectively moving the cable 44 along the endless path or continuous loop. The cable actuator 200 may include a driver, such as a capstan 248 (or spool), adapted to drive the cable 44 forward and backward along the endless path or continuous loop. The use of a capstan or spool may facilitate termination of or securing of the ends of the cable 44 without the use of a crimping tool or turnbuckle. The capstan 248 or spool may rotate about a central shaft 242.

In one aspect, the driver or capstan 248 may be driven manually, such as via a hand wheel 270. In another aspect, the driver or capstan 248 may be driven automatically, such as via a motor 250 (e.g. a servomotor). The cable actuator 200 may be provided with both a hand wheel 270 and a motor 250, such as to provide a user with options of either manual or automatic operation.

Figure 38:
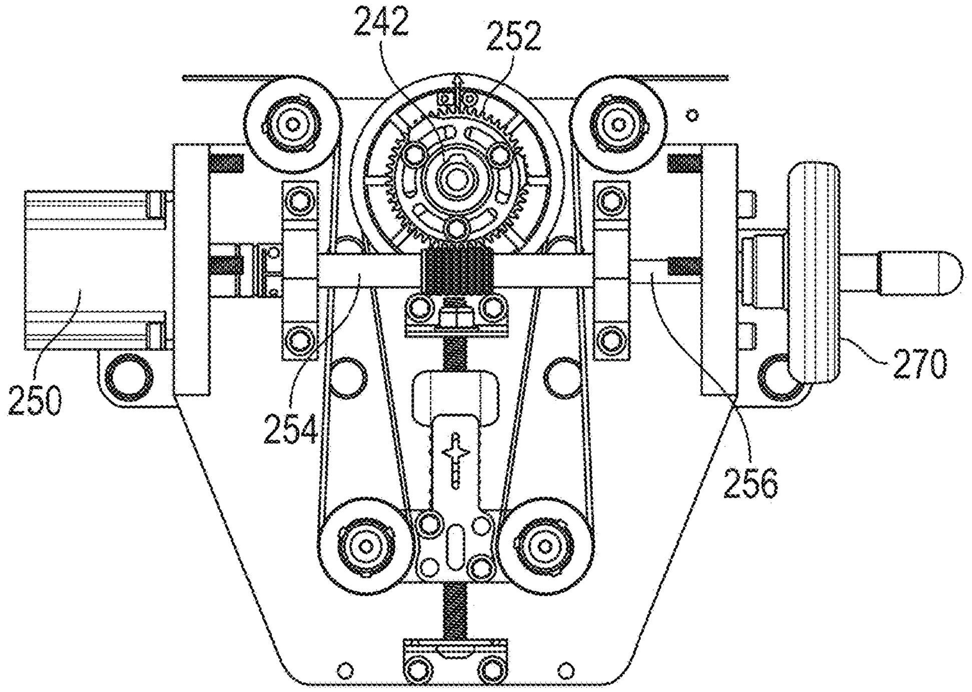
Figure 39:
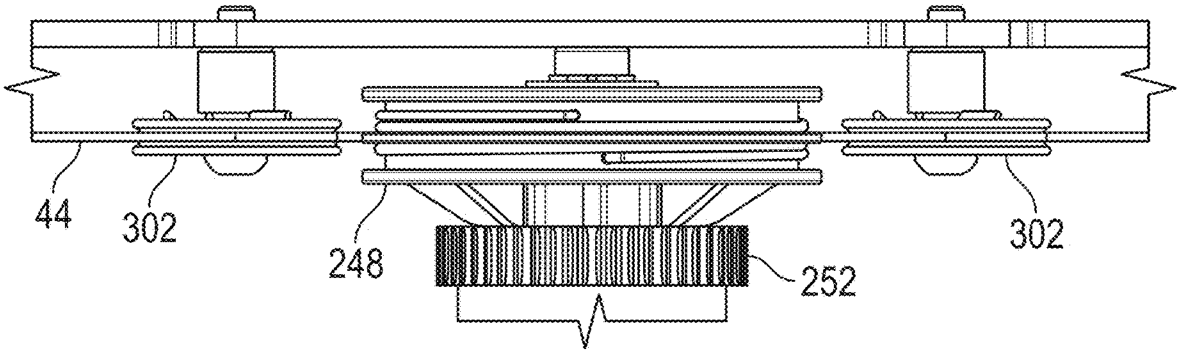

With specific reference to FIG. 38, the driver or capstan 248 may be connected to or otherwise associated with a driven gear 252. The driven gear 252 may be mounted on the central shaft 242. This driven gear 252 is illustrated as a wheel portion of a worm gear, but could be any gear connected with the capstan 248 and adapted to facilitate rotation of the capstan, such as a helical gear, a double helical gear, a herringbone gear, a bevel gear, a hypoid gear, or the like.

In one aspect, the driven gear 252 may be driven by a driving gear 254. As illustrated, the driving gear 254 is a threaded shaft portion of the worm gear, but the driving gear may be any sort of gear adapted for driving the driven gear 252. For example, in alternative embodiments, the driving gear may be any of a spur gear, a helical gear, a double helical gear, a herringbone gear, a bevel gear, a hypoid gear, or the like.

The driving gear 254 may be connected to or otherwise associated with a shaft 256, such as a crank shaft. The shaft 256 may be driven by the hand wheel 270 in one embodiment. In another embodiment, the shaft 256 may be driven by the motor 250. In a further embodiment, the shaft 256 may alternatively be driven by a hand wheel 270 or a motor 250. Thus, rotation of the shaft may cause rotation of the capstan 248, and thus move the cable 44 back and forth along the endless path or continuous loop.

In some embodiments, the cable actuator may include a tensioner 300 for providing a known or adjustable amount of tension on the cable 44. In one aspect, the tensioner 300 may be adapted to automatically place a predetermined amount of tension on the cable 44.

The tensioner may include one or more first pulleys 302 adapted to contact and facilitate movement of the cable 44 coming into and out of the tensioner 300. One or more second pulleys 304 may be provided in association with a tensioning sled 310. For example, the one or more second pulleys 304 may be mounted to the tensioning sled 310. These one or more second pulleys 304 may be adapted to receive the cable 44 from the one or more first pulleys and to return the cable 44 to the one or more first pulleys for continuing along the endless path or continuous loop.

The tensioning sled 310 may be adapted to travel along a rod 306, such as a threaded rod. By traveling along the rod 306, the tensioning sled 310 may be adapted to change a distance between the one or more first pulleys 302 and the one or more second pulleys 304. By changing this distance between the one or more first pulleys 302 and the one or more second pulleys 304, a tension in the cable 44 may be adjusted to apply more tension or less tension to the cable 44.

In some embodiments, the tensioner 300 may include a spring 312 and a stop block 314. The spring 312 may be a compression spring, and may be adapted to apply a force on the tensioning sled 310. For example, in the illustrated configuration of FIG. 40, if the spring 312 is compressed between the tensioning sled 310 and the stop block 314, the spring may apply a force on the tensioning sled 310 in a direction opposite the stop block 314, such as a downward force.

Alternatively, the stop block 314 may be positioned below the tensioning sled 310 with a tension spring therebetween. In such a configuration with the spring 312 in tension between the tensioning sled 310 and the stop block 314, then the spring 312 may apply a force on the tensioning sled 310 toward the stop block 314, such as a downward force.

In either configuration, the force applied to the tensioning sled 310 by the spring 312 may therefore increase the distance between the one or more first pulleys 302 and the one or more second pulleys 304 (or allow the distance therebetween to decrease), thus increasing or decreasing, respectively, the tension in the cable 44.

The spring 312 may be sized so as to provide a desired force within the tensioner 300. For example, a spring with a desired K-factor may be chosen such that the force applied by the spring 312 on the tensioning sled 310 may maintain a preselected tension in the cable 44. In a non-limiting example, the spring may have a K-factor of 20 lbs/in.

Figure 40:
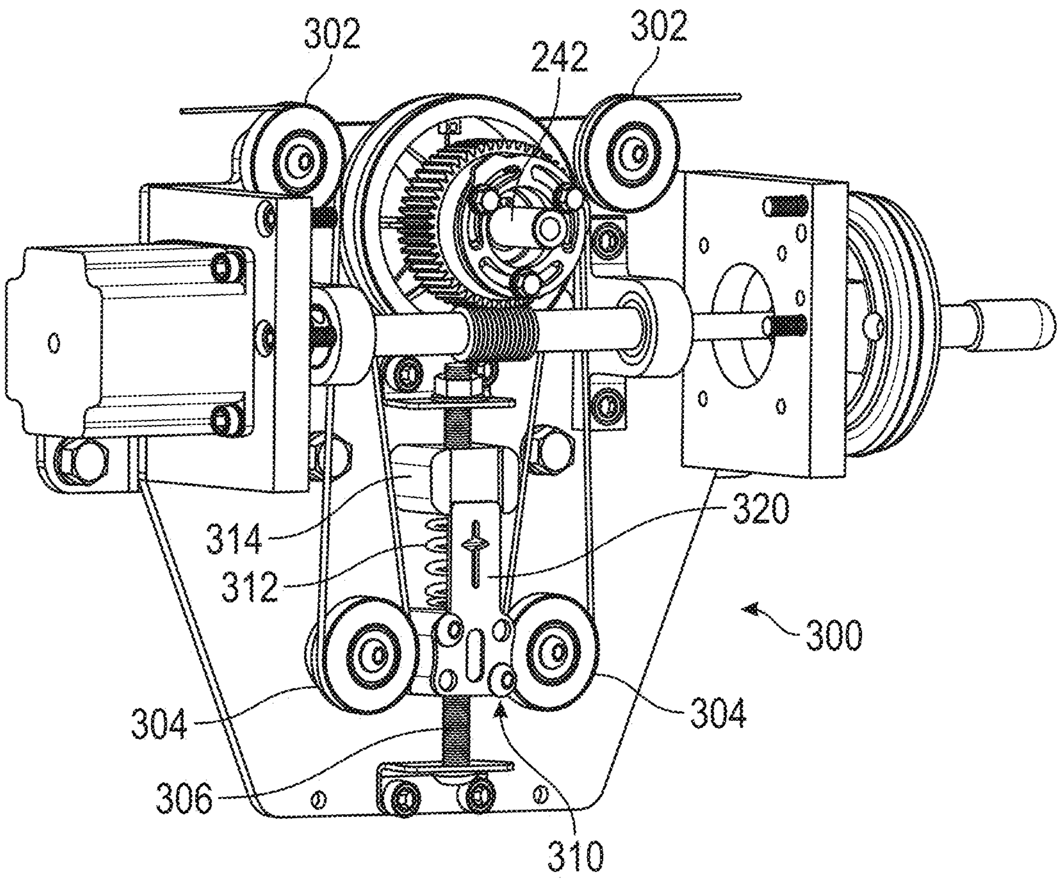

In one aspect, the tensioning sled 310 may include an indicator 320 adapted to provide a user with a visualization of a desired position of the tensioning sled 310 that may correspond to a desired resulting tension in the cable 44. The indicator 320 is illustrated in FIG. 40 as an indicator plate. Alignment of at least a portion of the indicator plate (e.g. the top of the indicator plate or a window or cross hatch within the indicator plate) with a predetermined point, such as the bottom of the stop block 314, the top of the stop block 314, or at any point along the stop block 314 (e.g. the middle or a specifically marked location) may provide the user with a visualization or notification of a position of the tensioning sled 310 corresponding to a predetermined tension of the cable 44. In other embodiments, the indicator may be any of a dial, a single or series of markings, a digital display, or a tension meter.

The position of the tensioning sled 310 along the rod 306 may be adjusted by a user. For example, in the example of a threaded rod 306, the tensioning sled 310 may be threadedly engaged with the rod 306, such that rotation of the rod 306 results in a change in the compression length of the spring, and thus movement of the tensioning sled 310 along the rod. This rotation of the rod 306 may be manual or automated (such as by a motor, not pictured).

In a non-limiting example, a motor 250 may be provided with a torque output of 17 in-oz (e.g. NEMA 23 size, 600 rpm output, McMaster #6627T53). Considering an increase in torque from the worm gear reduction, and using a capstan with a radius of 35 mm, the cable actuator 200 and tensioner 300 may be adapted to move a cable along the continuous path or endless loop at a tension of approximately between 30-35 lbs. force.

A user may correlate a tension force in the wire with a distance traveled by the tensioning sled, with knowledge about properties of the spring itself. For example, with reference to the diagram of FIG. 42, a tension T in the cable may produce a first force on the sled, such as in an upward manner, while the spring may produce a second force Fs on the sled, such as in a downward manner. With knowledge of the k-factor K of the spring, as well as an initial force produced by the spring and a position of the sled (or a correlating compressed spring length), a user may determine an equation that may allow alteration of any of the factors to adjust another factor. For example, if a specific tension T is desired in the cable, then with known spring characteristics, the user may adjust a position of a block against which the spring may act in order to ultimately change the tension T in the cable.

Specifically, the formula for the force in a spring may be characterized as follows:

$$Fs = Fp + K(Lf - Lc)$$

Where Fs is the reaction force of the spring against the sled, Fp is a spring preload force, K is the spring factor, Lf is the free length of the spring, and Lc is the compressed length of the spring.

In equilibrium, because the forces acting on the sled must balance, and with reference to FIG. 42, it can also be said that Fs=4T. Accordingly, the following equation may correlate the tension T in the cable to the counteracting spring characteristics:

$$4T = Fp + K(Lf - Lc)$$

One goal may be to determine an amount of spring compression, or a compressed length Lc of the spring, that will result in a known amount of tension T in the wire. Thus, the compression length Lc may be determined as follows:

$$Lc = Lf - (4T - Fp)/K$$

Once calculated, a user may then set a compression length in the spring (e.g. by rotating the rod to extend or contract the spring) in order to arrive at the desired cable tension T.

It may be advantageous to limit a distance that the cable 44 may travel in a given direction along the endless path or continuous loop. With reference to FIG. 41, a rotational stop 400 may be provided in any of the embodiments disclosed herein. The rotational stop 400 may include one or more stop plates 402 adapted to limit rotation of the capstan 248. As illustrated, the stop plates 402 are mounted on the central shaft 242, coaxially with the capstan 248. However, the stop plates 402 could also be mounted separately from the central shaft 242, and may indirectly engage the central shaft, such as by way of the driven gear 252. For example, the stop plates 402 may be mounted on a separate shaft from the central shaft 242, and may have a rotation that is "geared up" or "geared down" with respect to the rotation of the central shaft 242 (and the driven gear 252) to allow for different rotational speeds among the capstan 248 and the stop plates 402.

The one or more stop plates 402 may include one or more extensions 404. The extension(s) 404 may be radial (as illustrated) but may also extend in a non-radial direction. The extension 404 may be adapted to engage a stationary stop, such as a limit switch 420. In the embodiment employing a motor 250 for rotation of the shaft 256, the limit switch 420 may be adapted to prevent the motor 250 from rotating the shaft 256 beyond a predetermined position. Alternatively, the stationary stop may be a physical barrier, such as a bar, a hook, or other extension adapted to physically limit rotation of the extension 404, and thus the stop plate 402. In either case, the rotational stop may allow a user to place physical or electrical limitations on the distance that the cable 44 may travel by way of limiting the rotation of the capstan 248.

In some embodiments, the rotational stop 400 may include a plurality of stop plates 402. One or more of the plurality of stop plates 402 may include an adjustment aperture 406, which may selectively engage with a connector 408. The connector may be associated with another of the plurality of stop plates 402 or may be separably connected to each of the plurality of stop plates 402. By adjusting the connector 408 within the one or more adjustment apertures 406, a relative fixed position may be maintained between the plurality of stop plates 402. By fixing the relative position of the stop plates 402, a fixed relative angular position may be maintained between extensions 404 of the stop plates 402.

In the illustrated embodiment of FIG. 41, the rotational stop 400 includes two stop plates 402. Each of the stop plates 402 includes a plurality of adjustment apertures 406 in the form of arc-shaped or semi-annular apertures. A plurality of connectors 408 are provided in the form of bolts that may pass through at least one adjustment aperture 406 on each plate. This arrangement allows the stop plates 402 to be rotated relative to one another such that the connectors 408 may be passed through the adjustment apertures 406 in order to fix any desired relative angular position between the two stop plates 402. Accordingly, any desired angular rotational distance may be maintained between the extensions 404, thus providing the user with the ability to maintain any fixed distance that the cable 44 may travel, corresponding to that relative angular position of extensions 404.

With reference to FIGS. 43-48, an alternative embodiment of a cable actuator 500 for an adjustable guiderail arrangement for a conveyor C is illustrated. As noted above, cable actuator 500 is adapted for selectively moving the cable 44 along an endless path or continuous loop. The cable actuator 500 may include a driver in the form of a capstan 548 (or spool), adapted to drive the cable forward and backward along the endless path or continuous loop. The use of a capstan 548 or spool may facilitate termination of or securing of the ends of the cable 44 without the use of a crimping tool or turnbuckle. The capstan 548 or spool may rotate about an axis associated with a central shaft 542 to which it is attached.

Figure 46:
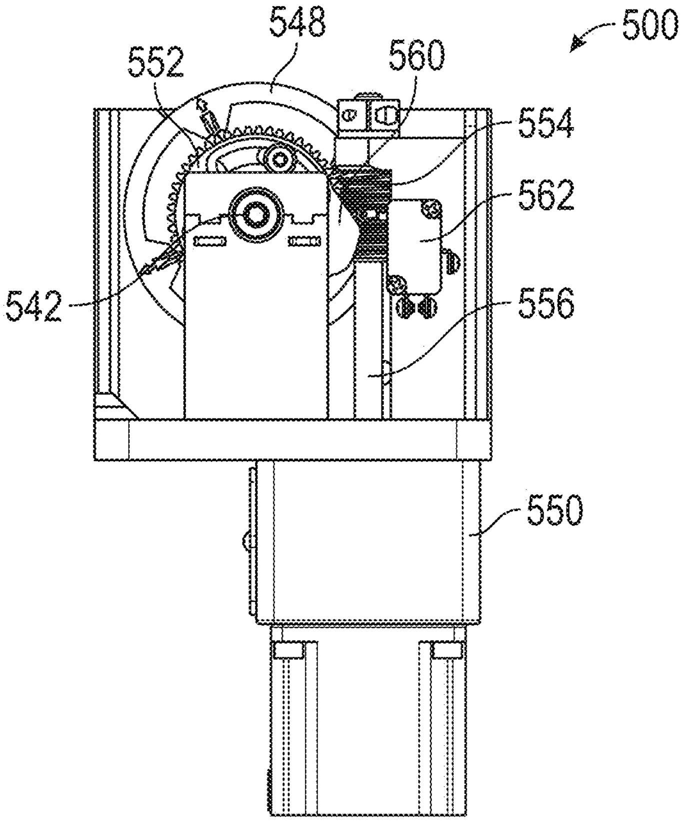

With specific reference to FIG. 46, the driver or capstan 548 may be connected to or otherwise associated with a driven gear 552. The driven gear 552 may be mounted on the central shaft 542. This driven gear 552 is illustrated as a wheel portion of a worm gear, but could be any gear connected with the capstan 548 and adapted to facilitate rotation of the capstan 548.

In one aspect, the driven gear 552 may be driven by a driving gear 554 mounted to a shaft 556. As illustrated, the driving gear 554 is a threaded shaft portion of the worm gear, but the driving gear may be any sort of gear adapted for driving the driven gear 552. The shaft 556 may be driven by a motor 550, but could also be manually driven, as previously noted. Rotation of the shaft 556 may thus cause rotation of the capstan 548, and thus move the cable back and forth along the endless path or continuous loop.

In some embodiments, the cable actuator 500 may include a tensioner 600 for providing tension on the cable 44. In the illustrated embodiment, the tensioner 600 comprises first and second pulleys 602, 604 adapted to contact and facilitate movement of the cable 44 along the endless path. Specifically, this second pulley 604 is adapted to receive the cable 44 from the first pulley 602 and to return the cable to the one or more first pulleys for continuing along the endless path or continuous loop.

Figure 47:
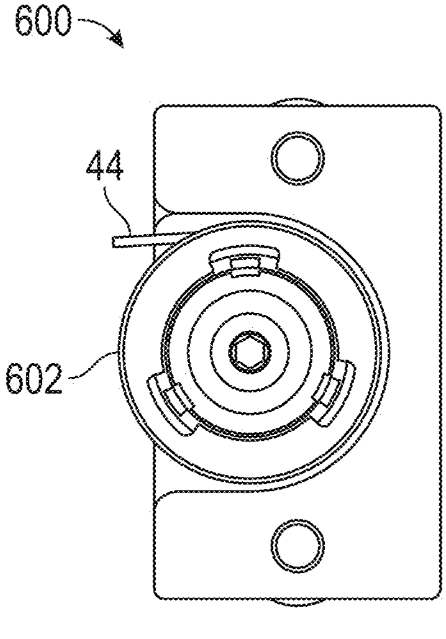
Figure 48:
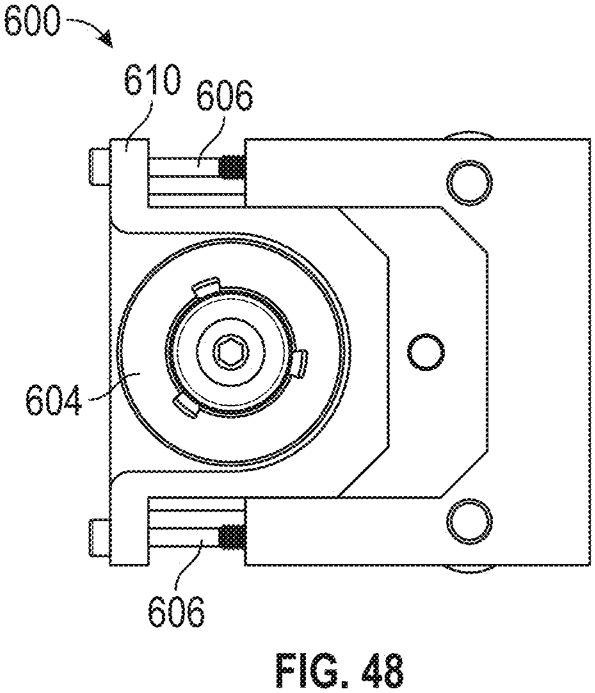

As can be understood from FIGS. 46-48, the second pulley 604 may be associated with a tensioning sled 610, which is positioned adjacent or closer to one end of the conveyor C, while the other pulley 602 is fixed in position adjacent or closer to another end of the conveyor C (and may be positioned along one or both sides of conveyor C, depending on the arrangement of adjustable guide rail(s) used). The tensioning sled 610 may be adapted to travel along rods 606, such as a threaded rod. By traveling along the rods 606, the tensioning sled 610 may be adapted to change a distance in a longitudinal direction between the first and second pulleys 602, 604. By changing this distance, tension in the cable 44 may be adjusted to advance or retract the adjusters 10 associated with the conveyor guiderail.

From FIG. 46, it can be seen that the capstan 548 may be associated with a cam 560, which may also be mounted to the central shaft 542. A rotational stop in the form of a limit switch 562 may also be positioned in the path of movement of this cam 560. Hence, when the capstan 548 (via shaft 542) is rotated in one direction an amount corresponding to the advance of the adjuster(s) 10, the cam 560 may engage the limit switch 562, which cuts off motor 550. Likewise, counter-rotation will reactivate motor until the cam 560 until the limit switch 562 is engaged on the opposite side, corresponding to the retraction of the adjuster(s) 10.

In a further aspect of the disclosure, a plurality of guiderails or sets of guiderails may be adjusted from a single controller 700, such as a human machine interface (HMI). For example, a single controller 700/HMI may be adapted to control or adjust a plurality of cable actuators 200, 500, each associated with or connected to one or more respective adjusters 10 for controlling the location of one or more respective guiderails 12 to control a width of one or more zones along a conveyor.

In one embodiment, the controller 700 may be adapted to control a plurality of cable actuators 200, 500 each of said cable actuators being responsible for control of a respective one or set of adjusters 10 on opposite sides of a given zone of a conveyor. Thus, the cable actuators 200, 500 may be adapted to extend and retract the guiderails associated with the respective one or set of adjusters 10 to maintain a width of a conveying path within that given zone of the conveyor.

In a further embodiment, a plurality of conveyor zone widths may be controlled by a single controller 700 (e.g., HMI) for controlling or adjusting a plurality of corresponding cable actuators 200, 500 (or pairs of cable adjusters) to extend or retract guiderails 12 in the respective conveyor zones. This may include a plurality of conveyor zones within a single conveyor, or a plurality of conveyor zones across a plurality of conveyors. These plurality of cable actuators 200, 500 may be controlled independently from one another, such that different motors 250, 550 may be operated with different set points for distance traveled by the cable (and thus different distances traveled by the respective guiderails). Accordingly, a single controller 700 may allow for the independent establishment of different conveying widths at different zones along a single conveyor or throughout a plurality of conveyors.

In one aspect, the different set points assigned to a given cable actuator 200, 500 or pair of cable actuators 200, 500 may correspond to a defined article or product to be conveyed. For example, the controller 700 may include a preset list of articles or products, with each article or product corresponding to a specific predetermined set point, and thereby defining a conveying width for a respective zone of a conveyor. This may allow a user to simply select an article or product from the preset list of articles or products corresponding to a specific conveyor or zone of a conveyor, wherein this selection automatically causes the guiderails 12 in the respective zone of the conveyor to be adjusted to a width corresponding to a width of the selected article or product.

In another aspect, the controller 700 may provide the user with the ability to set a maximum distance that a given cable actuator 200 may travel, and thus, that the cable 44 may travel along the endless path or continuous loop. By doing so, the user may select a fully extended and a fully retracted limit for the corresponding guiderails. The controller 700 may also allow a user to select a maximum speed at which the cable actuator 200, 500 may travel.

Within a control system as described herein, the plurality of cable actuators 200, 500 and tensioners 300, 600 may be wired together, such as in a daisy chain arrangement. This may allow for the addition or subtraction of any number of cable actuators 200, 500 and tensioners 300, 600 to the system. Accordingly, the system may be scalable for a number of different applications.

Summarizing, this disclosure may be considered to relate to any or all of the following items:

1. A system including a conveyor and a cable adapted to travel along an endless path to extend or retract a first adjustable guiderail for guiding one or more articles when being conveyed along the conveyor, comprising:

a cable actuator adapted to move the cable along an endless path, the cable actuator comprising:

a capstan adapted to receive at least a portion of the cable and rotate to cause the cable to move along the endless path; and a tensioner adapted to tension the cable.

2. The system of item 1, wherein the cable actuator further comprises a driver for driving the capstan.

3. The system of item 2, wherein the driver comprises a worm gear.

4. The system of item 3, wherein the worm gear is driven by a hand wheel.

5. The system of item 3, wherein the worm gear is driven by a motor.

6. The system of any of items 1-5, further including a limit switch to stop the capstan upon rotation of the rotatable driver by a first predetermined amount in a first direction corresponding to extension of the first adjustable guiderail.

7. The system of item 6, wherein the limit switch is adapted to stop the capstan upon rotation of the rotatable driver a second predetermined amount in a second direction opposite the first direction corresponding to retraction of the first adjustable guiderail.

8. The system of any of items 1-7, wherein the tensioner comprises a first pulley and a second pulley, the cable is adapted to extend around the first pulley and the second pulley, and the cable actuator is adapted to change a distance between the first and second pulleys.

9. The system of item 8, further including a tensioning sled to which the second pulley is attached.

10. The system of item 7, wherein the tensioning sled is adapted to travel along one or more rods.

11. The system of item 8, wherein the first pulley is located closer to one end of the conveyor and the second pulley is located closer to an opposite end of the conveyor.

12. The system of item 8, further including an indicator adapted to indicate a change in cable tension.

13. The system of item 12, wherein the indicator comprises an indicator plate connected to the tensioning sled, and wherein alignment of the indicator plate with a predetermined location on the cable actuator corresponds to a predetermined tension in the cable.

14. The system of any items 1-13, further including a rotational stop adapted to limit a rotational distance traveled by the capstan.

15. The system of item 14, wherein the rotational stop comprises at least one extension adapted to engage a stationary stop to limit rotation of the capstan.

16. The system of item 15, wherein the stationary stop comprises a limit switch for halting movement of the capstan.

17. The system of item 16, wherein the rotational stop comprises a plurality of stop plates, each of the stop plates including at least one extension, wherein the plurality of stop plates are adapted to be adjustable in a plurality of relative angular positions in order to offset a respective first extension on a first of the plurality of stop plates from a respective second extension on a second of the plurality of stop plates.

18. The system of item 17, wherein at least one of the plurality of stop plates includes at least one adjustment aperture, and further including a connector adapted to pass through the at least one adjustment aperture for fixing relative angular positions of the plurality of stop plates.

19. The system of item 15, wherein the rotational stop and the capstan are commonly mounted on a central shaft.

20. The system of any of items 1-19, further comprising:

a second cable adapted to travel along a second continuous path for extending and retracting a second adjustable guiderail; and a second cable actuator adapted to move the second cable along the second continuous path;

wherein the first adjustable guiderail and the second adjustable guiderail are in opposition along the conveyor, and extension and retraction of the first adjustable guiderail and the second adjustable guiderail changing a width of a conveying path therebetween.

21. The system of item 20, further comprising a controller adapted to coordinate control of the first cable actuator and the second cable actuator.

22. The system of item 21, wherein the controller comprises a plurality of preset conditions for the first and second adjustable guiderails, each of the preset conditions corresponding to a width of a different article to be conveyed.

23. A system for a conveyor for conveying one or more articles, comprising:

a first adjustable guiderail for guiding the one or more articles on the conveyor;

a cable adapted to move for extending or retracting the first adjustable guiderail; and a cable actuator including a capstan adapted to receive at least a portion of the cable and rotate to cause the cable to move along the endless path.

24. The system of item 23, wherein the cable actuator further comprises a driver for driving the capstan.

25. The system of item 23 or item 24, wherein the driver comprises a worm gear.

26. The system of item 25, wherein the worm gear is driven by a hand wheel.

27. The system of item 25, wherein the worm gear is driven by a motor.

28. The system of any of items 23-27, further including a limit switch to stop the capstan upon rotation of the rotatable driver by a first predetermined amount in a first direction corresponding to extension of the first adjustable guiderail.

29. The system of item 28, wherein the limit switch is adapted to stop the capstan upon rotation of the rotatable driver a second predetermined amount in a second direction opposite the first direction corresponding to retraction of the first adjustable guiderail.

30. The system of any of items 23-29, further including a tensioner adapted to tension the cable.

31. The system of item 30, wherein the tensioner comprises a first pulley and a second pulley, the cable is adapted to extend around the first pulley and the second pulley, and the cable actuator is adapted to change a distance between the first and second pulleys.

32. The system of item 31, further including a tensioning sled attached to the second pulley.

33. The system of item 32, wherein the tensioning sled is adapted to travel along one or more rods.

34. The system of item 31, wherein the first pulley is located closer to one end of the conveyor and the second pulley is located closer to an opposite end of the conveyor.

35. The system of item 32, further including an indicator adapted to indicate a change in cable tension.

36. The system of item 35, wherein the indicator comprises an indicator plate connected to the tensioning sled, and wherein alignment of the indicator plate with a predetermined location on the cable actuator corresponds to a predetermined tension in the cable.

37. The system of any of items 23-36, further including a rotational stop adapted to limit rotation of the capstan.

38. The system of item 37, wherein the rotational stop comprises at least one extension adapted to engage a stationary stop to limit rotation of the capstan.

39. The system of item 38, wherein the stationary stop comprises a limit switch for limiting rotation of the capstan based on contact with the at least one extension.

40. The system of item 39, wherein the rotational stop comprises a plurality of stop plates, each of the stop plates including at least one extension, wherein the plurality of stop plates are adapted to be adjustable with respect to each other in a plurality of angular positions to offset a respective first extension on a first of the plurality of stop plates from a respective second extension on a second of the plurality of stop plates.

41. The system of item 40, wherein at least one of the plurality of stop plates includes at least one adjustment aperture, and further including a connector adapted to pass through the at least one adjustment aperture for fixing relative angular positions of the plurality of stop plates.

42. The system of item 37, wherein the rotational stop and the capstan are commonly mounted on a central shaft.

43. The system of any items 23-42, further comprising:

- a second cable adapted to travel along a second endless path for extending and retracting a second adjustable guiderail; and
- a second cable actuator adapted to move the second cable along the second endless path;
- wherein the first adjustable guiderail and the second adjustable guiderail are in opposition along the conveyor, and extension and retraction of the first adjustable guiderail and the second adjustable guiderail changing a width of a conveying path therebetween.

44. The system of item 43, further comprising a controller adapted to coordinate control of the first cable actuator and the second cable actuator.

45. The system of item 44, wherein the controller comprises a plurality of preset conditions for the first adjustable guiderail and the second adjustable guiderail, each of the preset conditions corresponding to a width of a different article to be conveyed.

46. A system for a conveyor for conveying one or more articles, comprising:

- a first adjustable guiderail for guiding the one or more articles on the conveyor;
- a cable adapted to travel along an endless path to extend or retract the first adjustable guiderail; and
- a cable actuator adapted to move the cable along the endless path, the cable actuator comprising a tensioner for tensioning the cable, the tensioner comprising a first pulley for engaging the cable.

47. The system of item 46, wherein the cable actuator further comprises a driver for driving a capstan for at least partially receiving a portion of the cable.

48. The system of item 47, wherein the driver comprises a worm gear.

49. The system of item 48, wherein the worm gear is driven by a hand wheel.

50 The system of item 48, wherein the worm gear is driven by a motor.

51. The system of any of items 47-50, further including a limit switch to stop the capstan upon rotation of the driver by a first predetermined amount in a first direction corresponding to extension of the first adjustable guiderail.

52. The system of item 51, wherein the limit switch is adapted to stop the capstan upon rotation of the driver a second predetermined amount in a second direction opposite the first direction corresponding to retraction of the first adjustable guiderail.

53. The system of any of items 46-52, wherein the tensioner further comprises a second pulley, the cable is adapted to extend around the first pulley and the second pulley, and the cable actuator is adapted to change a distance between the first and second pulleys.

54 The system of item 53, further including a tensioning sled attached to the second pulley.

55. The system of item 54, wherein the tensioning sled is adapted to travel along one or more rods.

56. The system of any of items 53-55, wherein the first pulley is located closer to one end of the conveyor and the second pulley is located closer to an opposite end of the conveyor.

57. The system of any of items 46-56, further including an indicator adapted to indicate a change in cable tension.

58. The system of item 57, wherein the indicator comprises an indicator plate connected to the tensioning sled, and wherein alignment of the indicator plate with a predetermined location on the cable actuator corresponds to a predetermined tension in the cable.

59. The system of item 47, further including a rotational stop adapted to limit rotation of the capstan.

60. The system of item 59, wherein the rotational stop comprises at least one extension adapted to engage a stationary stop to limit rotation of the capstan.

61. The system of item 60, wherein the stationary stop comprises a limit switch for limiting rotation of the capstan based on contact between the at least one extension and the limit switch.

62. The system of item 60, wherein the rotational stop comprises a plurality of stop plates, each of the stop plates including at least one extension, wherein the plurality of stop plates are adapted to be adjustable in a plurality of angular positions in order to offset a respective first extension on a first of the plurality of stop plates from a respective second extension on a second of the plurality of stop plates.

63. The system of item 62, wherein at least one of the plurality of stop plates includes at least one adjustment aperture, and further including a connector adapted to pass through the at least one adjustment aperture for fixing relative angular positions of the plurality of stop plates.

64. The system of item 60, wherein the rotational stop and the capstan are commonly mounted on a central shaft.

65. The system of any of items 46-64, further comprising:

- a second cable adapted to travel along a second endless path for extending and retracting a second adjustable guiderail; and
- a second cable actuator adapted to move the second cable along the second endless path;
- wherein the first adjustable guiderail and the second adjustable guiderail are in opposition along the conveyor, and extension and retraction of the first adjustable guiderail and the second adjustable guiderail changing a width of a conveying path therebetween.

66. The system of item 65, further comprising a controller adapted to coordinate control of the first cable actuator and the second cable actuator.

67. The system of item 66, wherein the controller comprises a plurality of preset conditions for the first adjustable guiderail and the second adjustable guiderail, each of the preset conditions corresponding to a width of a different article to be conveyed.

68. A system for a conveyor for conveying one or more articles, comprising:

a first adjustable guiderail for guiding the one or more articles on the conveyor;

a first cable adapted to travel along a first endless path to extend or retract the first adjustable guiderail;

a first cable actuator adapted to move the first cable along the first endless path;

a second adjustable guiderail for guiding the one or more articles on the conveyor;

a second cable adapted to travel along a second endless path to extend or retract the second adjustable guiderail;

a second cable actuator adapted to move the second cable along the second endless path; and a controller adapted to coordinate control of the first cable actuator and the second cable actuator.

69. The system of item 68, wherein the controller comprises a plurality of preset conditions, each of the preset conditions corresponding to a width of an article to be conveyed, and wherein each of the preset conditions further corresponds to a width of the conveying path between the first adjustable guiderail and the second adjustable guiderail.

The foregoing descriptions of various embodiments provide an illustration of the inventive concepts. The descriptions are not intended to be exhaustive or to limit the disclosed invention to the precise form disclosed. Modifications or variations are also possible in light of the above teachings. Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. The terms "substantially," "about," or "approximately" are meant to mean as close to the corresponding condition as reasonably possible, and typically not varying from it by more than 10%, unless circumstances indicate otherwise. Any species element of a genus element can have the characteristics or elements of any other species element of that genus. The term "comprising" is not meant to be limiting. The above-described configurations, elements or complete assemblies and methods and their elements for carrying out the invention, and variations of aspects of the invention can be combined and modified with each other in any combination.

The invention claimed is:

1. A system including a conveyor and a cable adapted to travel along an endless path to extend or retract a first adjustable guiderail for guiding one or more articles when being conveyed along the conveyor, comprising:

a cable actuator adapted to move the cable along an endless path, the cable actuator comprising:

a capstan adapted to receive at least a portion of the cable and rotate to cause the cable to move along the endless path; and a tensioner adapted to tension the cable and configured to travel in a direction transverse to a conveying direction of the conveyor.

2. The system of claim 1, wherein the cable actuator further comprises a driver for driving the capstan.

3. The system of claim 2, wherein the driver comprises a worm gear.

4. The system of claim 3, wherein the worm gear is driven by a hand wheel.

5. The system of claim 3, wherein the worm gear is driven by a motor.

6. The system of claim 1, further including a limit switch to stop the capstan upon rotation of the rotatable driver by a first predetermined amount in a first direction corresponding to extension of the first adjustable guiderail.

7. The system of claim 6, wherein the limit switch is adapted to stop the capstan upon rotation of the rotatable driver a second predetermined amount in a second direction opposite the first direction corresponding to retraction of the first adjustable guiderail.

8. The system of claim 1, wherein the tensioner comprises a first pulley and a second pulley, the cable is adapted to extend around the first pulley and the second pulley, and the cable actuator is adapted to change a distance between the first and second pulleys.

9. The system of claim 8, further including a tensioning sled to which the second pulley is attached.

10. The system of claim 7, wherein the tensioning sled is adapted to travel along one or more rods.

11. The system of claim 8, wherein the first pulley is located closer to one end of the conveyor and the second pulley is located closer to an opposite end of the conveyor.

12. The system of claim 8, further including an indicator adapted to indicate a change in cable tension.

13. The system of claim 12, wherein the indicator comprises an indicator plate connected to the tensioning sled, and wherein alignment of the indicator plate with a predetermined location on the cable actuator corresponds to a predetermined tension in the cable.

14. The system of claim 1, further including a rotational stop adapted to limit a rotational distance traveled by the capstan.

15. The system of claim 14, wherein the rotational stop comprises at least one extension adapted to engage a stationary stop to limit rotation of the capstan.

16. The system of claim 15, wherein the stationary stop comprises a limit switch for halting movement of the capstan.

17. The system of claim 16, wherein the rotational stop comprises a plurality of stop plates, each of the stop plates including at least one extension, wherein the plurality of stop plates are adapted to be adjustable in a plurality of relative angular positions in order to offset a respective first extension on a first of the plurality of stop plates from a respective second extension on a second of the plurality of stop plates.

18. The system of claim 17, wherein at least one of the plurality of stop plates includes at least one adjustment aperture, and further including a connector adapted to pass through the at least one adjustment aperture for fixing relative angular positions of the plurality of stop plates.

19. The system of claim 15, wherein the rotational stop and the capstan are commonly mounted on a central shaft.

20. The system of claim 1, further comprising:

a second cable adapted to travel along a second continuous path for extending and retracting a second adjustable guiderail; and a second cable actuator adapted to move the second cable along the second continuous path;

wherein the first adjustable guiderail and the second adjustable guiderail are in opposition along the conveyor, and extension and retraction of the first adjustable guiderail and the second adjustable guiderail changing a width of a conveying path therebetween.

21. The system of claim 20, further comprising a controller adapted to coordinate control of the first cable actuator and the second cable actuator.

22. The system of claim 21, wherein the controller comprises a plurality of preset conditions for the first and second adjustable guiderails, each of the preset conditions corresponding to a width of a different article to be conveyed.

* * * * *